(12) United States Patent
Nomura et al.

(10) Patent No.: US 7,230,773 B2
(45) Date of Patent: Jun. 12, 2007

(54) DRIVE MECHANISM OF A ZOOM LENS

(75) Inventors: Hiroshi Nomura, Saitama (JP);
 Kazunori Ishizuka, Kanagawa (JP);
 Toshiharu Suzuki, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 11/209,631

(22) Filed: Aug. 24, 2005

(65) Prior Publication Data

US 2006/0056078 A1 Mar. 16, 2006

(30) Foreign Application Priority Data

Aug. 31, 2004 (JP) .............................. 2004-253386

(51) Int. Cl.
 *G02B 15/14* (2006.01)
(52) U.S. Cl. .................. 359/696; 359/819; 359/811; 359/821
(58) Field of Classification Search ................ 359/819, 359/811, 813, 814, 821, 822, 823, 824, 826
See application file for complete search history.

(56) References Cited

U.S. PATENT DOCUMENTS

| 4,764,784 | A | 8/1988 | Torikoshi et al. |
| 6,147,814 | A | 11/2000 | Kitazawa et al. |
| 2002/0141074 | A1* | 10/2002 | Nakane ...................... 359/699 |
| 2003/0156832 | A1 | 8/2003 | Nomura et al. |
| 2004/0042089 | A1 | 3/2004 | Nomura |
| 2004/0042091 | A1 | 3/2004 | Nomura |
| 2004/0042777 | A1 | 3/2004 | Nomura |
| 2004/0051971 | A1 | 3/2004 | Nomura |

FOREIGN PATENT DOCUMENTS

| JP | 2001-174686 | 6/2001 |
| JP | 2003-050342 | 2/2003 |
| JP | 2004-109709 | 4/2004 |
| JP | 2004-212624 | 7/2004 |

OTHER PUBLICATIONS

English language Abstract of JP 2001-174686.
English language Abstract of JP 2003-050342.
English language Abstract of JP 2004-109709.
English language Abstract of JP 2004-212624.
U.S. Appl. No. 11/209,617 to Isizuka et al., filed Aug. 24, 2005.

* cited by examiner

*Primary Examiner*—Timothy Thompson
(74) *Attorney, Agent, or Firm*—Greenblum & Bernstein, P.L.C.

(57) ABSTRACT

A drive mechanism of a zoom lens includes three movable members which support optical elements, including a front movable member, an intermediate movable member and a rear movable member; a common driving member including a driving device for moving the three movable members independently; and a biasing member including first and second spring members which bias the three movable members to remove backlash. One of the front movable member and the rear movable member serves as a common-engaging spring support member to which one end of each of the first and second spring members are connected, and the other of the front movable member and the rear movable member, and the intermediate movable member serve as two single-engaging spring support members to which the other ends of the first spring member and the second spring member are connected, respectively.

12 Claims, 33 Drawing Sheets

DRIVE MECHANISM OF A ZOOM LENS

BACKGROUND OF THE INVENTION

1. Field of the Invention

The present invention relates to a zoom lens, more particularly to a spring-biasing structure in a drive mechanism for driving optical elements of the zoom lens such as lens groups.

2. Description of the Related Art

In drive mechanisms of zoom lenses for driving optical elements such as lens groups, it is generally the case that a plurality of movable frames which are moved in an optical axis direction relative to one another in different moving manners are biased mutually by biasing springs to remove backlash in the plurality of movable frames. Specifically, there is a high possibility of an external force being exerted on one or more external barrels of the zoom lens, and accordingly, external barrels of the zoom lens need to be biased as appropriate by strong biasing forces to be capable of returning to respective normal positions of the external lens barrels when undergoing displacement by an external force. In telescopic zoom lenses having a plurality of external barrels which are concentrically arranged, it is conventional for the frontmost external barrel (usually the radially-innermost external barrel) to hold a lens group having the largest diameter among all the lens groups of a photographing optical system, so that the frontmost external barrel tends to be heavier in weight than the other movable barrels or frames. Therefore, such an external barrel is often required to be biased by a strong biasing spring force in order to be held with stability.

In the case where three movable members (a frontmost movable member, an intermediate movable member and a rearmost movable member) which are aligned along an optical axis are mutually spring-biased, it is conventional for one end of each two biasing springs to be fixed to the frontmost movable member and the rearmost movable member, respectively, and the other ends of the two biasing springs are fixed to the intermediate movable member.

However, the biasing spring forces of the biasing springs vary due to the difference in amount of movement among the movable frames including the aforementioned one or more external barrels, which makes it difficult to apply a stable biasing spring force to each movable frame. For instance, since the minimum biasing force among variations in the biasing spring force exerted on the movable frames needs to be determined as a reference spring load (minimum return force), the spring load grows excessively upon the spring biasing force becoming maximum, and may become a great burden on operations of the zoom lens. As a result, in the case of a motor-driven zoom lens, a zoom motor thereof needs to be a large type producing a strong torque, which makes it difficult to achieve miniaturization and weight reduction of the zoom lens.

In the above described structure in which the two biasing springs are arranged on the front side and the rear side of the intermediate movable member, respectively, each biasing spring cannot have a greater length than the distance between associated two movable members adjacent to the biasing spring in the optical axis direction, and therefore needs to be a biasing spring having a relatively large spring constant. However, using such a biasing spring makes it difficult to assemble the zoom lens. Additionally, in this structure it is difficult to achieve the balance between the two biasing springs.

SUMMARY OF THE INVENTION

The present invention provides a drive mechanism for driving a plurality of optical elements of a zoom lens, wherein the drive mechanism can exert a stable biasing spring force to each of a plurality of movable frames which respectively support the plurality of optical elements without increasing the spring load on the movable frames excessively. The present invention further provides a drive mechanism for driving a plurality of optical elements of a zoom lens, wherein the installation of biasing springs and the setting (adjustment) of the biasing force thereof are easy to carry out.

According to an aspect of the present invention, a drive mechanism of a zoom lens is provided, for driving at least three optical elements of a photographing optical system in an optical axis direction, the drive mechanism including a front movable member, an intermediate movable member and a rear movable member, in that order from the front of the zoom lens in the optical axis direction, which support the three optical elements, respectively, and are guided linearly in the optical axis direction without rotating, wherein one of the front movable member and the rear movable member serves as a common-engaging spring support member, and the other of the front movable member and the rear movable member, and the intermediate movable member serve as two single-engaging spring support members; a common driving member including a driving device for moving the front, intermediate and rear movable members independently of one another in the optical axis direction; and a first spring member and a second spring member for removing backlash between the front, intermediate and rear movable members and the driving device, both one end of the first spring member and one end of the second spring member being connected to the common-engaging spring support member and the other ends of the first spring member and the second spring member being connected to the two single-engaging spring support members, respectively.

It is desirable for the first spring member and second spring member to bias the common-engaging spring support member in the same biasing direction in the optical axis direction.

It is desirable for the first and second spring members to be arranged so that when one of the biasing forces of the first spring member and the second spring member increases, the other of the biasing forces thereof decreases when the front, intermediate and rear movable members are moved independently of one another in the optical axis direction by the common driving member in accordance with a zooming operation of the photographing optical system.

It is desirable for the common-engaging spring support member to be an external member of the zoom lens.

It is desirable for the three optical elements that are supported by the front, intermediate and rear movable members to include three lens groups, respectively, and for the lens group supported by the common-engaging spring support member to have the largest diameter among all the three lens groups.

It is desirable for the optical element supported by the common-engaging spring support member to include a frontmost lens group in the photographing optical system.

It is desirable for the common driving member to include a cam ring rotatable about the optical axis. The driving device of the common driving member includes a first cam groove, a second cam groove and a third cam groove which are formed on at least one of inner and outer peripheral surfaces of the cam ring to have different cam diagrams. The three movable members include a first cam follower, a second cam follower and a third cam follower which are slidably engaged in the first cam groove, the second cam groove and the third cam groove, respectively.

It is desirable for each of the first spring member and the second spring member to include at least one extension coil spring.

It is desirable for the zoom lens to be a telescopic zoom lens having a plurality of external movable barrels which are concentrically arranged about the optical axis, the common-engaging spring support member serving as a radially-innermost external movable barrel among the plurality of external movable barrels.

It is desirable for the rear movable member to be guided linearly in the optical axis direction by a linear guide member provided independently of the three movable members.

In an embodiment, a drive mechanism of a zoom lens is provided, including a front movable member, an intermediate movable member and a rear movable member, in that order from the front of the zoom lens which are guided linearly in an optical axis direction without rotating; a cam ring including cam grooves, into which cam followers formed on the front, intermediate and rear movable members are slidably fitted, the cam ring being rotated about the optical axis to move the front, intermediate and rear movable members independently of one another in the optical axis direction; and a first spring member and a second spring member which bias the front, intermediate and rear movable members mutually in the optical axis direction to remove backlash between the cam followers and the cam grooves. Both one end of the first spring member and one end of the second spring member are connected to one of the front movable member and the rear movable member, and the other ends of the first spring member and the second spring member are connected to the other of the front movable member and the rear movable member, and the intermediate movable member, respectively.

In an embodiment, a drive mechanism of a zoom lens is provided, including a front movable member, an intermediate movable member and a rear movable member, in that order from the front of the zoom lens in the optical axis direction, wherein one of the front movable member and the rear movable member serves as a common-engaging spring support member, and the other of the front movable member and the rear movable member, and the intermediate movable member serve as two single-engaging spring support members; a common driving member including a driving device for moving the front, intermediate and rear movable members independently of one another in an optical axis direction; and a first spring member and a second spring member for removing backlash between the front, intermediate and rear movable members and the driving device, both one end of the first spring member and one end of the second spring member being connected to the common-engaging spring support member and the other ends of the first spring member and the second spring member being connected to the two single-engaging spring support members, respectively.

According to the present invention, the drive mechanism can exert a stable biasing spring force to each of the plurality of movable frames without increasing the spring load on the movable frames excessively with a simple structure. Moreover, the workability of installing the biasing springs and the workability of balancing the biasing spring force of the biasing springs are improved.

The present disclosure relates to subject matter contained in Japanese Patent Application No. 2004-253386 (filed on Aug. 31, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
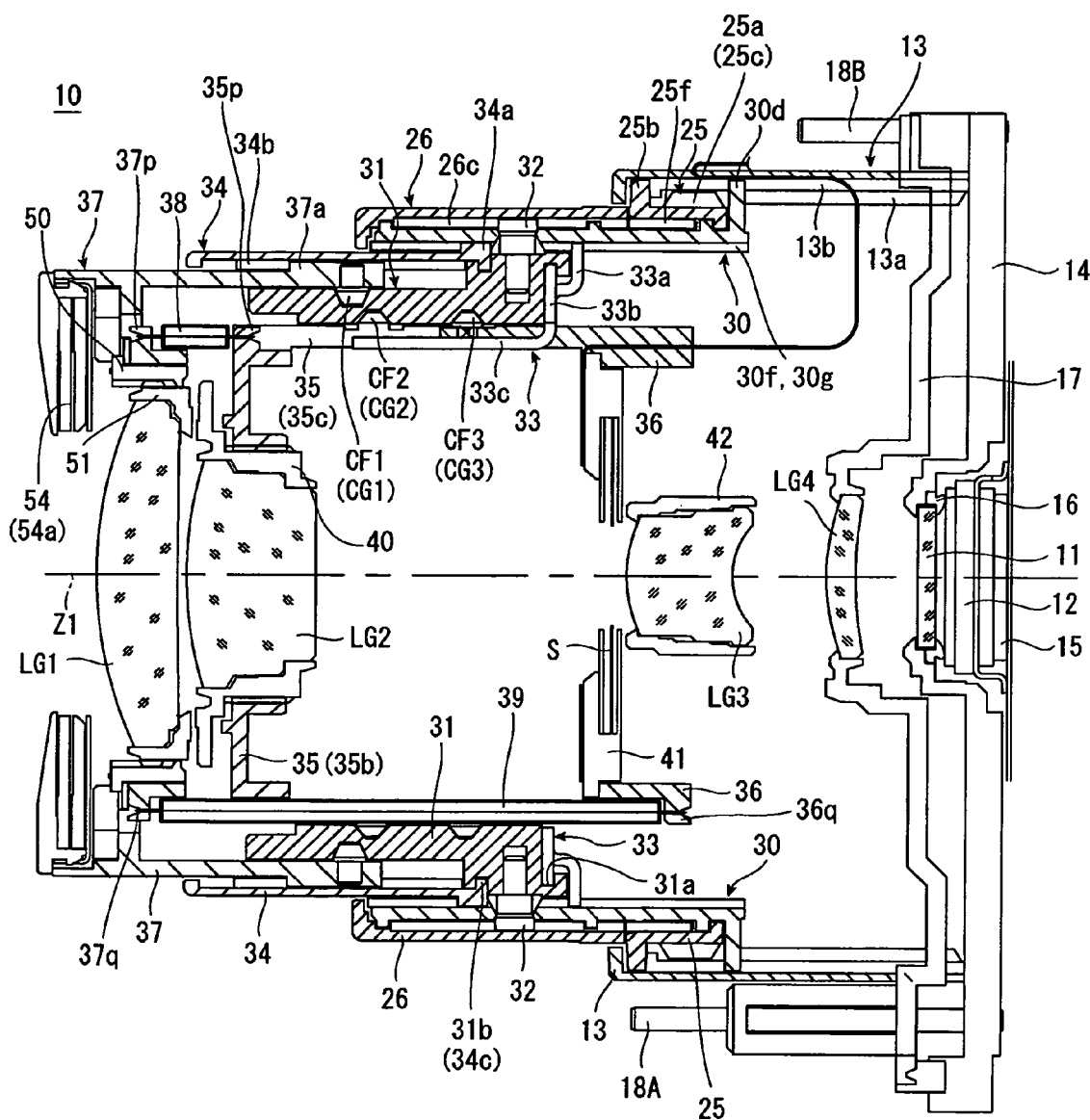
FIG. 1 is a longitudinal sectional view of an embodiment of a zoom lens according to the present invention at the wide-angle extremity.
Figure 2:
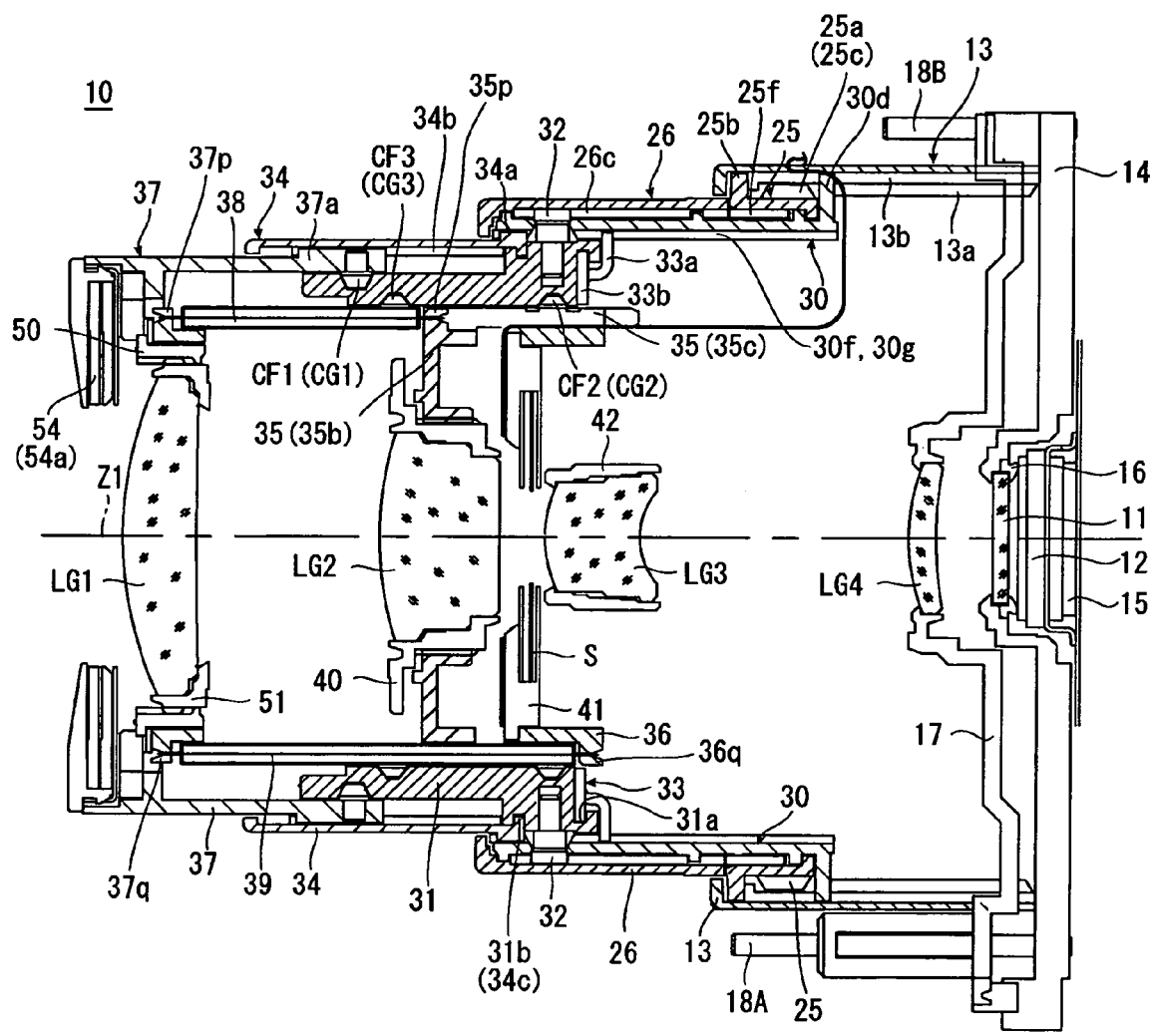
FIG. 2 is a longitudinal sectional view of the zoom lens shown in FIG. 1 at the telephoto extremity.
Figure 3:
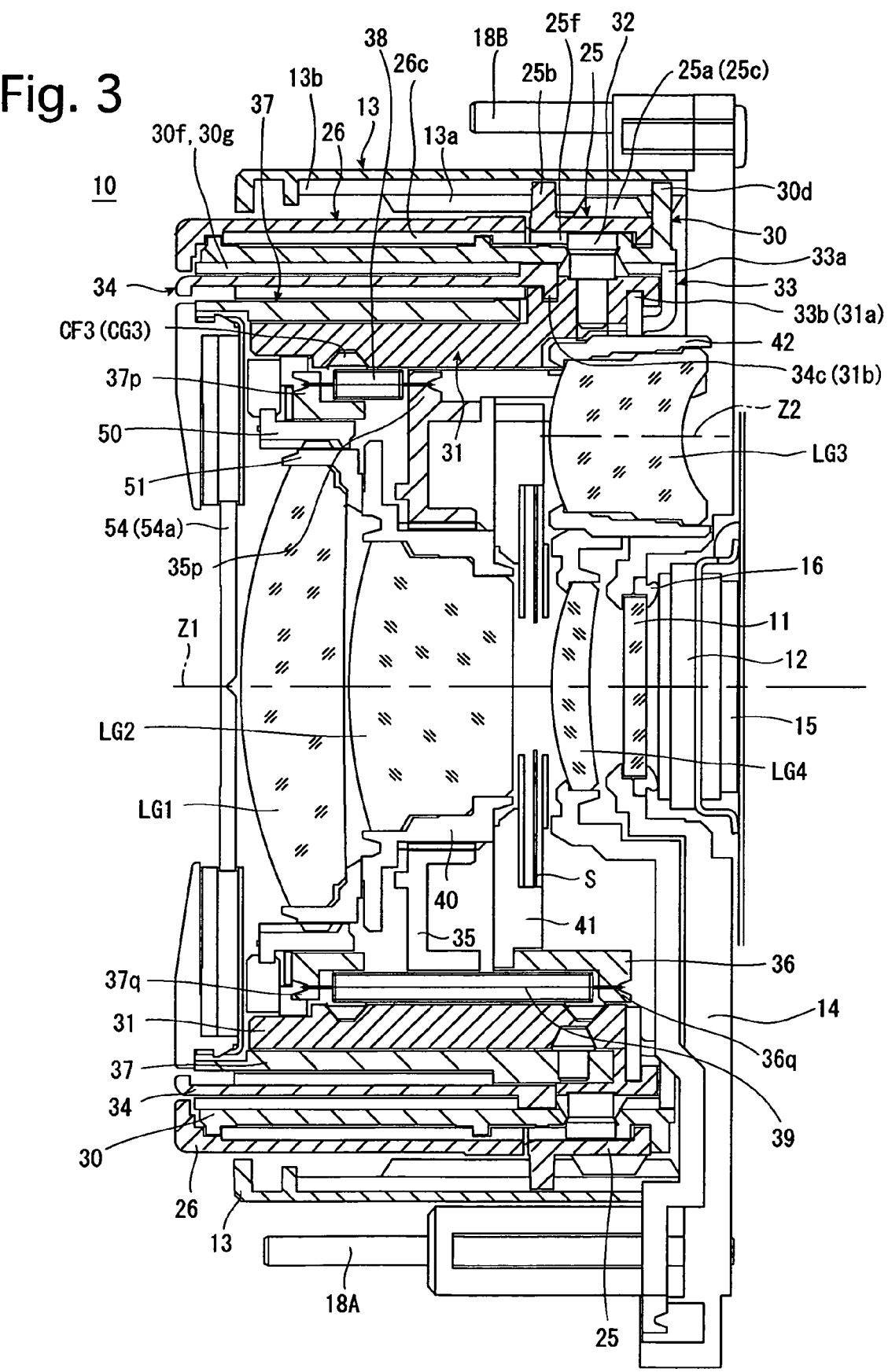
FIG. 3 is a longitudinal sectional view of the zoom lens shown in FIG. 1 in the accommodated state (fully-retracted state) thereof.

FIGS. 1 through 3 show an embodiment of a zoom lens according to the present invention in different states. FIG. 1 shows a state of the zoom lens 10 at the wide-angle extremity, FIG. 2 shows a state of the zoom lens 10 at the telephoto extremity, and FIG. 3 shows a state of the zoom lens in a retracted position (fully retracted position). The zoom lens 10 is incorporated in a digital camera (the camera body thereof is not shown in the drawings). As shown in FIGS. 1 and 2, the photographing optical system of the zoom lens 10 in a ready-to-photograph state of the zoom lens 10 consists of a first lens group LG1, a second lens group LG2, a shutter S, a third lens group LG3, a fourth lens group LG4, a low-pass filter (optical filter) 11, and a CCD image sensor (solid-state image pick-up device) 12. The first lens group LG1, the second lens group LG2 and the third lens group LG3 are driven along a photographing optical axis Z1 in a predetermined moving manner to perform a zooming operation, while the fourth lens group L4 is driven along the photographing optical axis Z1 to perform a focusing operation. In the following description, the term "optical axis direction" refers to a direction parallel to the photographing optical axis Z1 unless otherwise stated.

Figure 4:
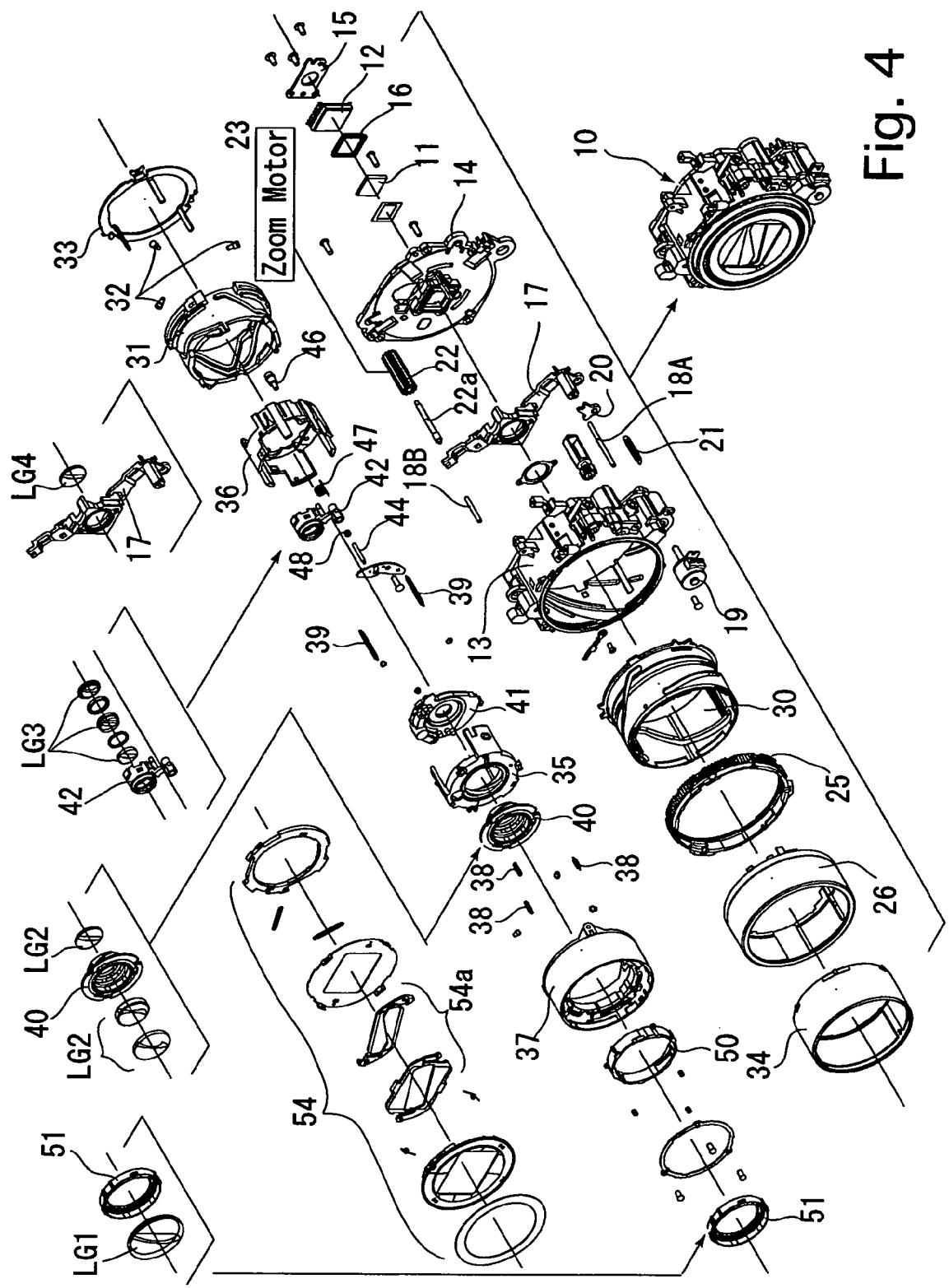
FIG. 4 is an exploded perspective view of elements of the zoom lens shown in FIGS. 1 through 3.

FIG. 4 is an exploded view of elements of the zoom lens 10, and FIGS. 5 through 12 are enlarged views of these elements. The zoom lens 10 is incorporated in a camera body (not shown), and is provided with a stationary barrel 13 fixed to the camera body. A CCD holder (stationary member) 14 is fixed to a rear portion of the stationary barrel 13 from behind. The CCD image sensor 12 is mounted to a central portion of the CCD holder 14 to be held thereby via a CCD base plate 15. The low-pass filter 11 is held by the CCD holder 14 to be positioned in front of the CCD image sensor 12. An annular sealing member 16 is installed between the lower-pass filter 11 and the CCD image sensor 12 to seal the gap therebetween.

The zoom lens 10 is provided in the stationary barrel 13 with an AF lens frame (a fourth lens frame which supports and holds the fourth lens group LG4) 17 which is guided linearly in the optical axis direction without rotating about the photographing optical axis Z1. Specifically, the zoom lens 10 is provided with a pair of AF guide shafts 18A and 18B which extend parallel to the photographing optical axis Z1 to guide the AF lens frame 17 in the optical axis direction without rotating the AF lens frame 17 about the photographing optical axis Z1. Front and rear ends of each guide shaft of the pair of AF guide shafts 18A and 18B are fixed to the stationary barrel 13 and the CCD holder 14, respectively. The AF lens frame 17 is provided on radially opposite sides thereof with a pair of guide holes (guide grooves) in which the pair of AF guide shafts 18A and 18B are respectively fitted so that the AF lens frame 17 is slidable on the pair of AF guide shafts 18A and 18B. Portions of the stationary barrel 13 and the CCD holder 14 which support the pair of AF guide shafts 18A and 18B project radially outwards from the outside diameter of the stationary barrel 13, and accordingly, the pair of AF guide shafts 18A and 18B are positioned radially outside of the stationary barrel 13.

The zoom lens 10 is provided therein with an AF motor 19 which is fixed to the stationary barrel 13. The AF lens frame 17 can be moved forward and rearward in the optical axis direction by a driving force of the AF motor 19. A rotary drive shaft of the AF motor 19 is threaded to serve as a feed screw shaft (rotatable lead screw), and this rotary drive shaft is screwed through a female screw hole formed on an AF nut 20 (see FIG. 5). The AF lens frame 17 is engaged with the AF nut 20 to be slidable thereon in the optical axis direction, and is biased forward in the optical axis direction by an extension coil spring (biasing member) 21, and the forward movement limit of the AF lens frame 17 is determined via the engagement between surfaces of the AF nut 20 and the AF lens frame 17 which are opposed to each other in the optical axis direction. A rearward movement of the AF nut 20 in the optical axis direction by a rotation of the rotary drive shaft of the AF motor 19 causes the AF lens frame 17 to be pressed rearward by the AF nut 20 to be moved rearward against the biasing force of the extension coil spring 21. Due to this structure, rotating the rotary drive shaft of AF motor 19 forward and rearward causes the AF lens frame 17 to move forward and rearward in the optical axis direction.

The zoom lens 10 is provided with a zoom gear 22 which is supported by the stationary barrel 13 to be rotatable on a zoom gear shaft 22a extending parallel to the photographing optical axis Z1. Front and rear ends of the zoom gear shaft 22a are fixed to the stationary barrel 13 and the CCD holder 14, respectively. The zoom gear 22 is positioned so that the gear teeth thereof partly project radially inwards from an inner peripheral surface of the stationary barrel 13, and can be rotated forward and reverse by a zoom motor 23 (shown conceptually by a labeled rectangle in FIG. 4).

Figure 5:
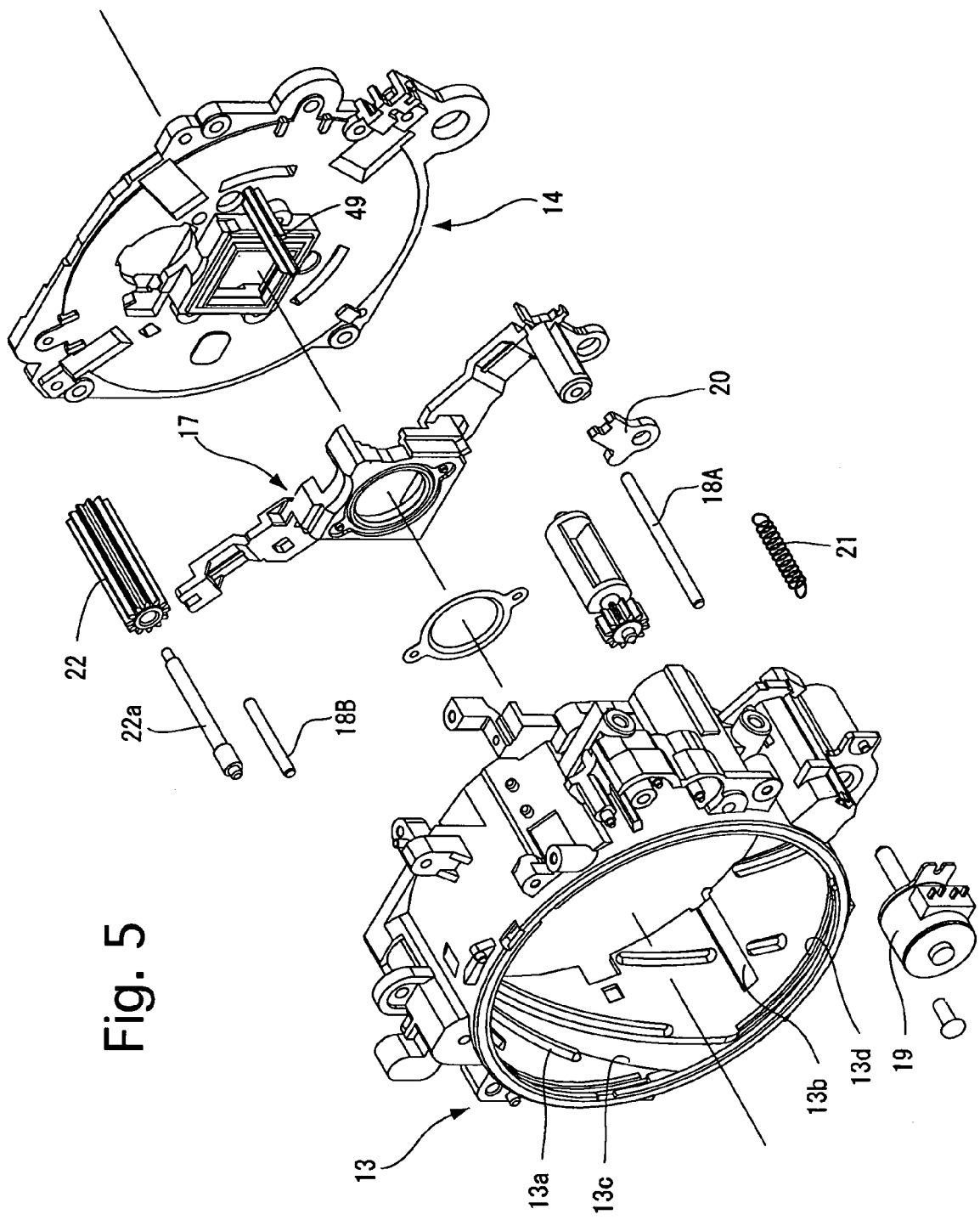
FIG. 5 is an exploded perspective view of a CCD holder, a stationary barrel and other elements of the zoom lens shown in FIGS. 1 through 3.

As shown in FIG. 5, the stationary barrel 13 is provided on an inner peripheral surface thereof with a female helicoid 13a, a set of three linear guide grooves 13b, a set of three inclined grooves 13c, and a set of three rotational guide grooves 13d. Threads of the female helicoid 13a extend in a direction inclined with respect to both the optical axis direction and a circumferential direction of the stationary barrel 13. The set of three linear guide grooves 13b extend parallel to the photographing optical axis Z1. The set of three inclined grooves 13c extend parallel to the female helicoid 13a. The set of three rotational guide grooves 13d are formed in the vicinity of a front end of the inner peripheral surface of the stationary barrel 13 to extend along a circumference of the stationary barrel 13 to communicate the front ends of the set of three inclined grooves 13c, respectively. The female helicoid 13a is not formed on a specific front area of the inner peripheral surface of the stationary barrel 13 which is positioned immediately behind the set of three rotational guide grooves 13d. Regarding each set of the above three sets of grooves (the set of three linear guide grooves 13b, the set of three inclined grooves 13c and the set of three rotational guide grooves 13d), although each set of grooves is composed of three grooves which are arranged at different circumferential positions on the inner peripheral surface of the stationary lens barrel 13, only some of the three grooves appear in FIG. 5.

Figure 6:
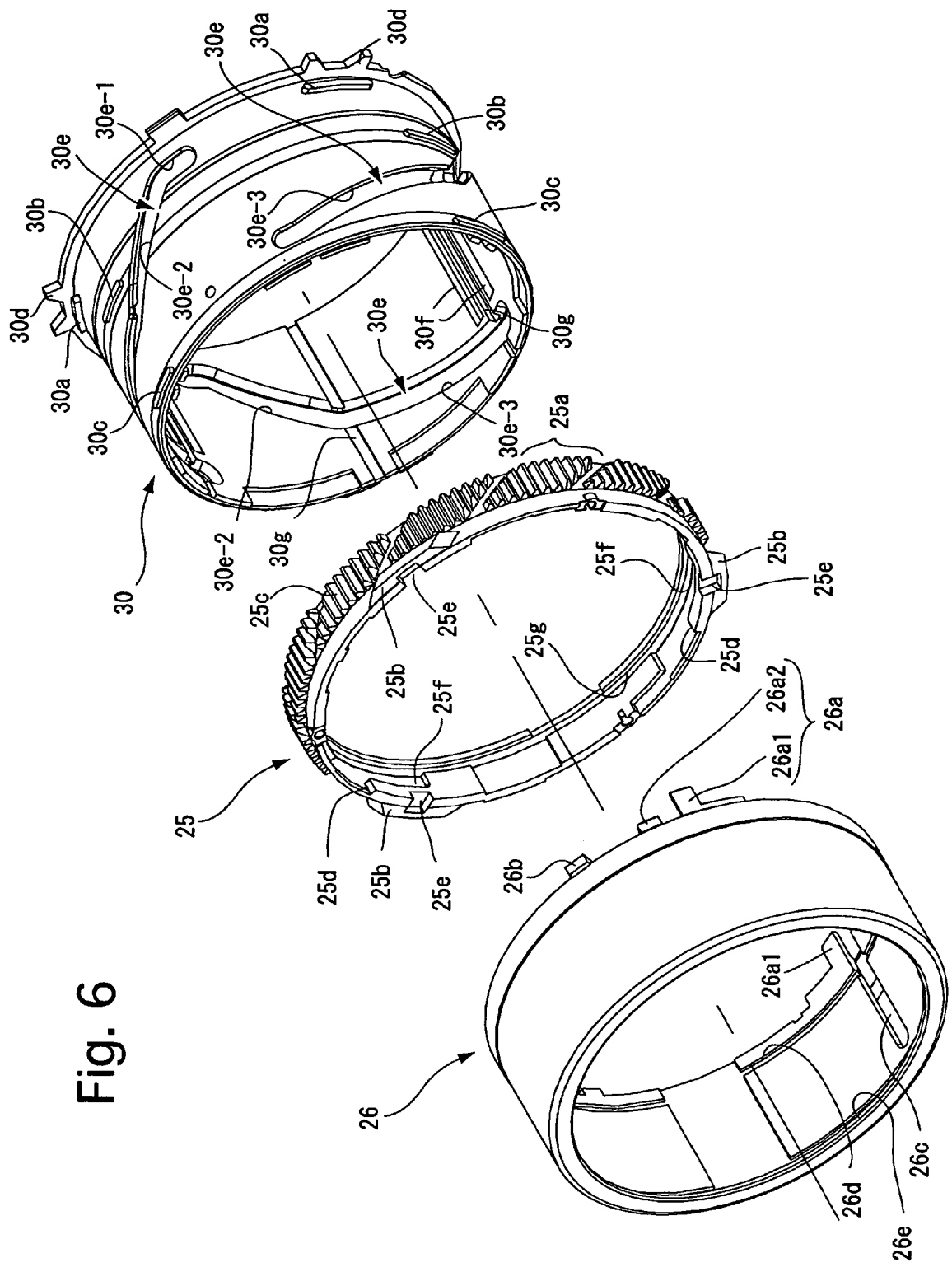
FIG. 6 is an exploded perspective view of a first linear guide ring, a helicoid ring and a third external barrel of the zoom lens shown in FIGS. 1 through 3.
Figure 7:
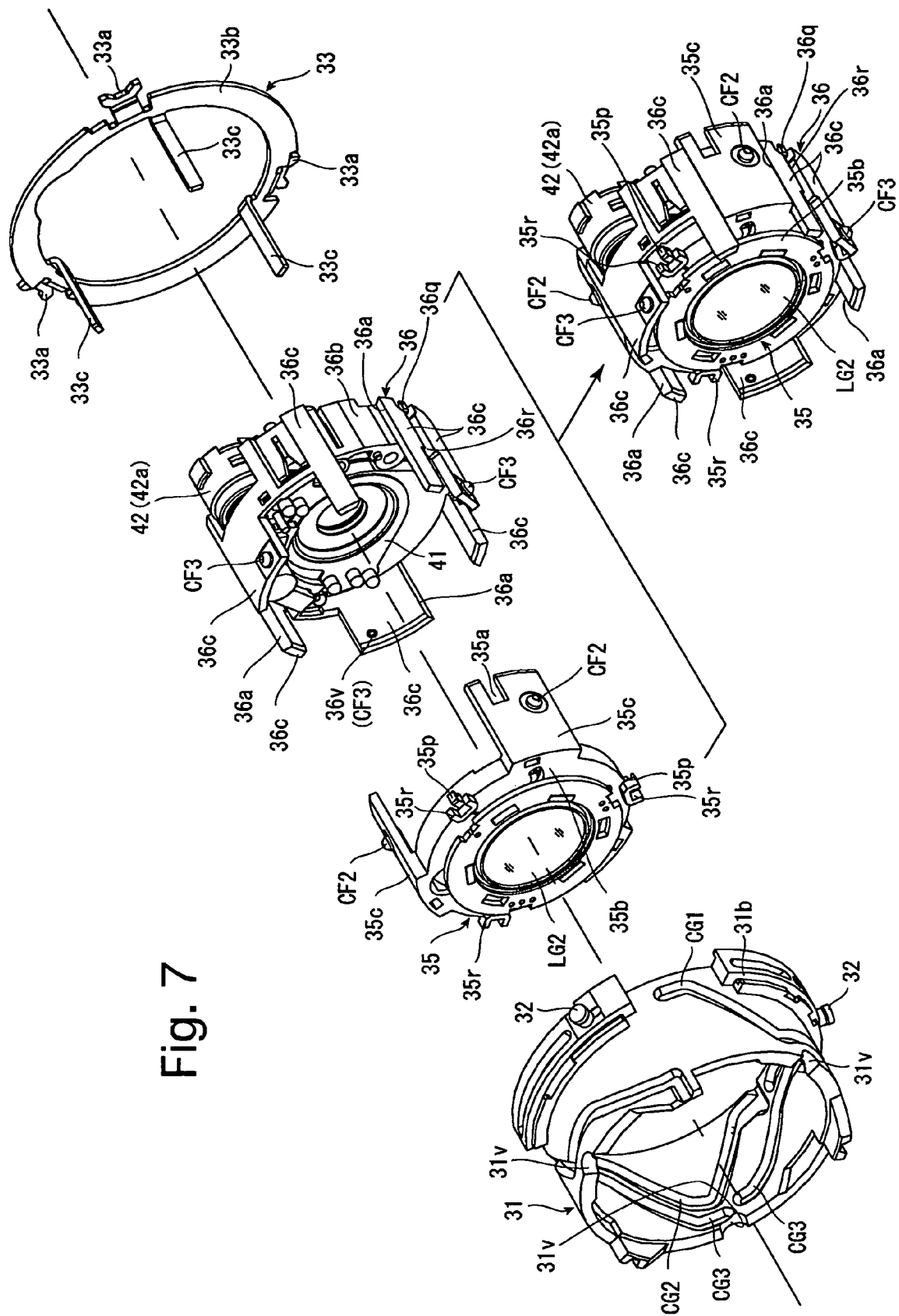
FIG. 7 is an exploded perspective view of a cam ring, a second linear guide ring, a second lens group moving frame and a third lens group moving frame which are shown in FIG. 4.
Figure 8:
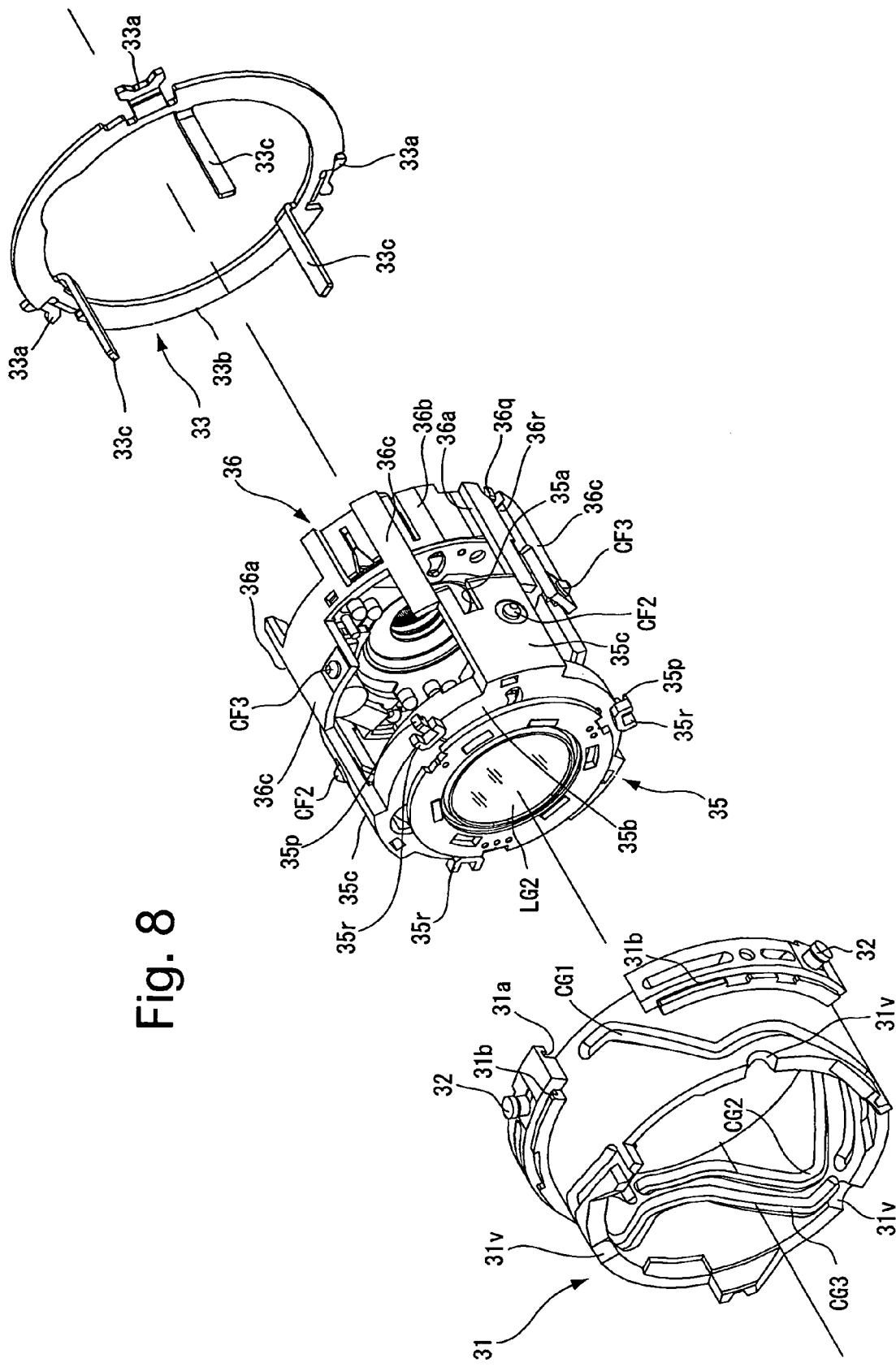
FIG. 8 is an exploded perspective view of the cam ring, the second linear guide ring, the second lens group moving frame and the third lens group moving frame of the zoom lens shown in FIGS. 4 and 7, showing the relative position between the second lens group moving frame and the third lens group moving frame at the wide-angle extremity of the zoom lens.
Figure 9:
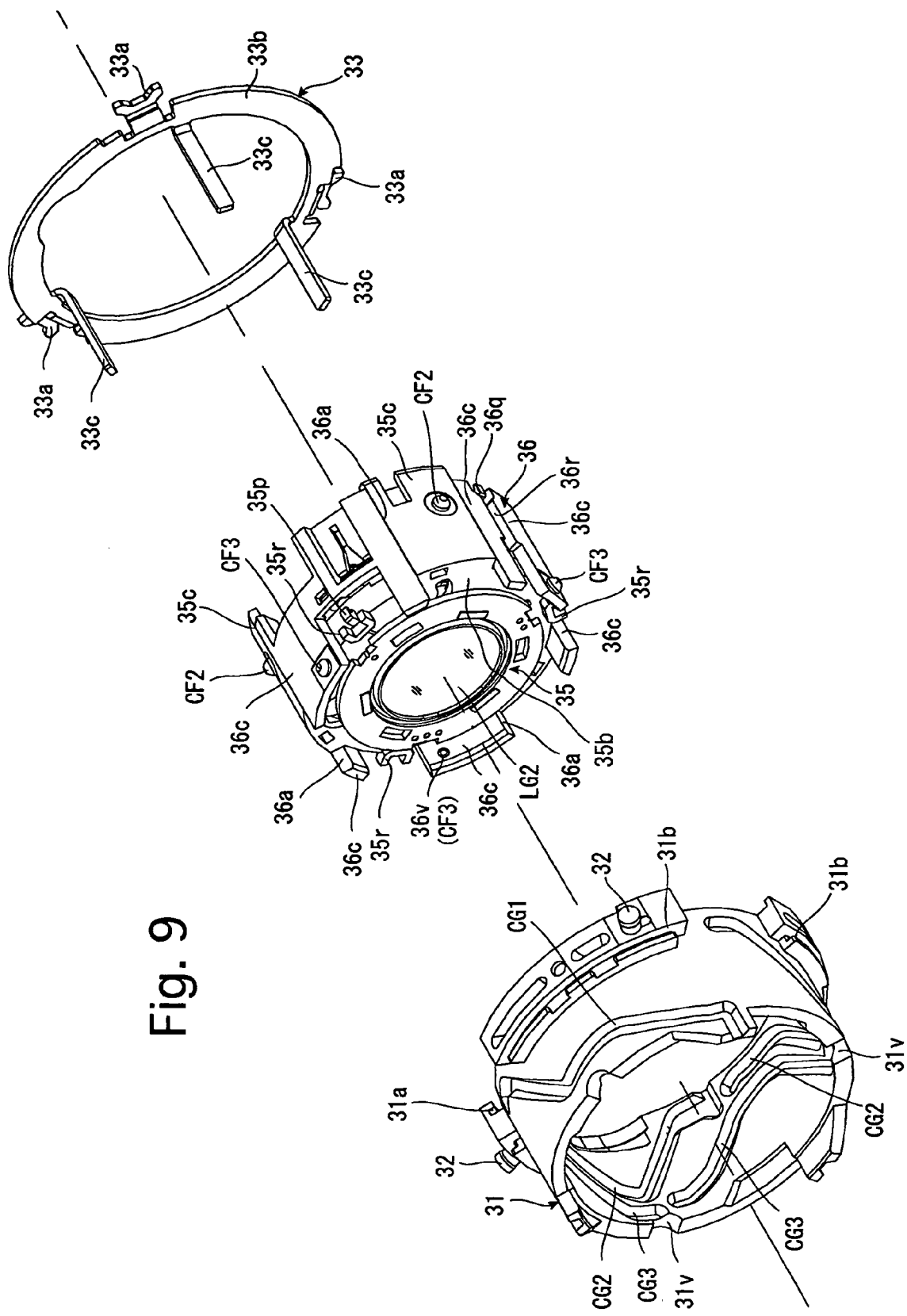
FIG. 9 is an exploded perspective view of the cam ring, the second linear guide ring, the second lens group moving frame and the third lens group moving frame of the zoom lens shown in FIGS. 4 and 7, showing the relative position between the second lens group moving frame and the third lens group moving frame at the telephoto extremity of the zoom lens.
Figure 10:
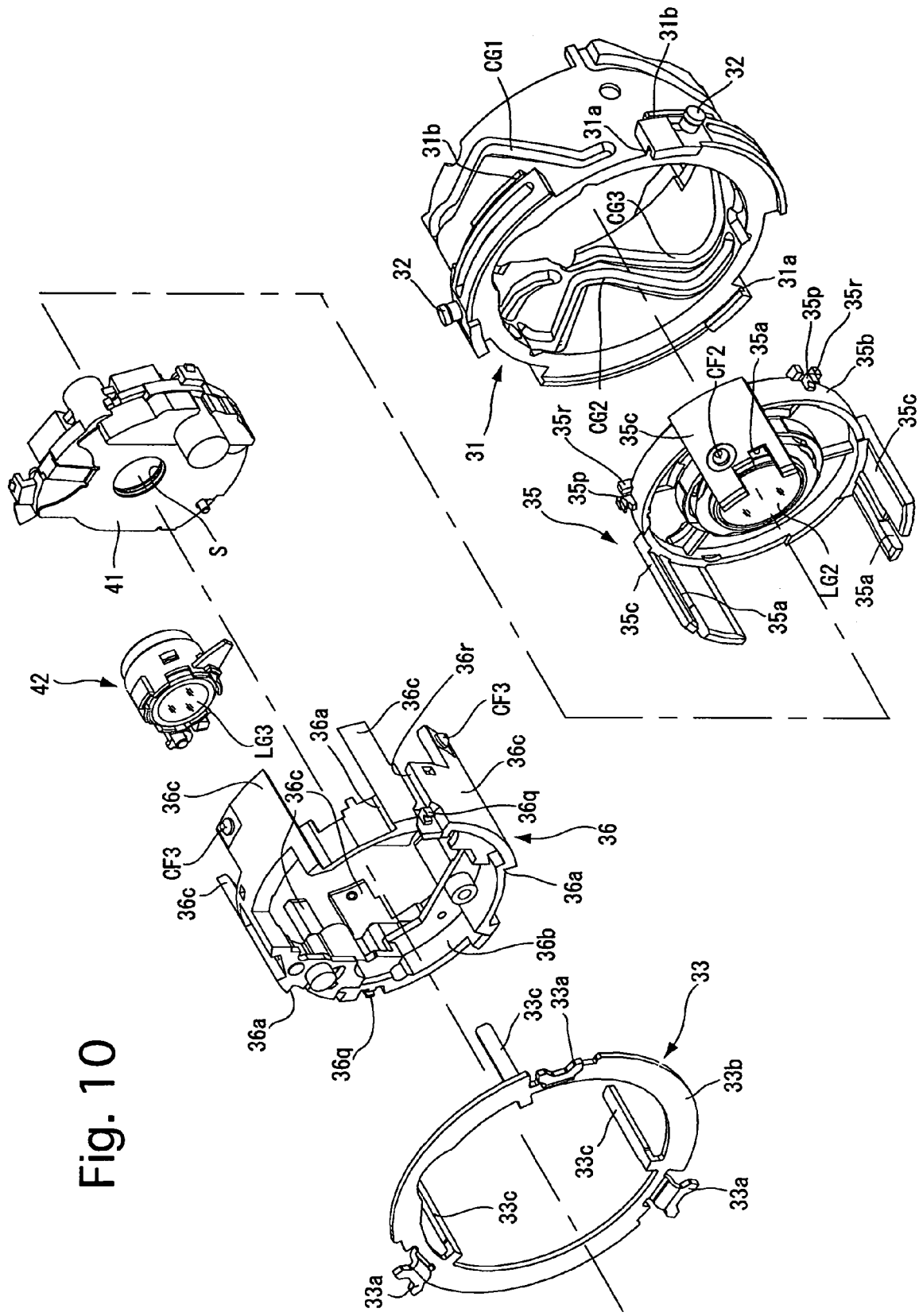
FIG. 10 is an exploded perspective view of the cam ring, the second linear guide ring, the second lens group moving frame and the third lens group moving frame, viewed from a side different from the side shown in FIG. 7.
Figure 11:
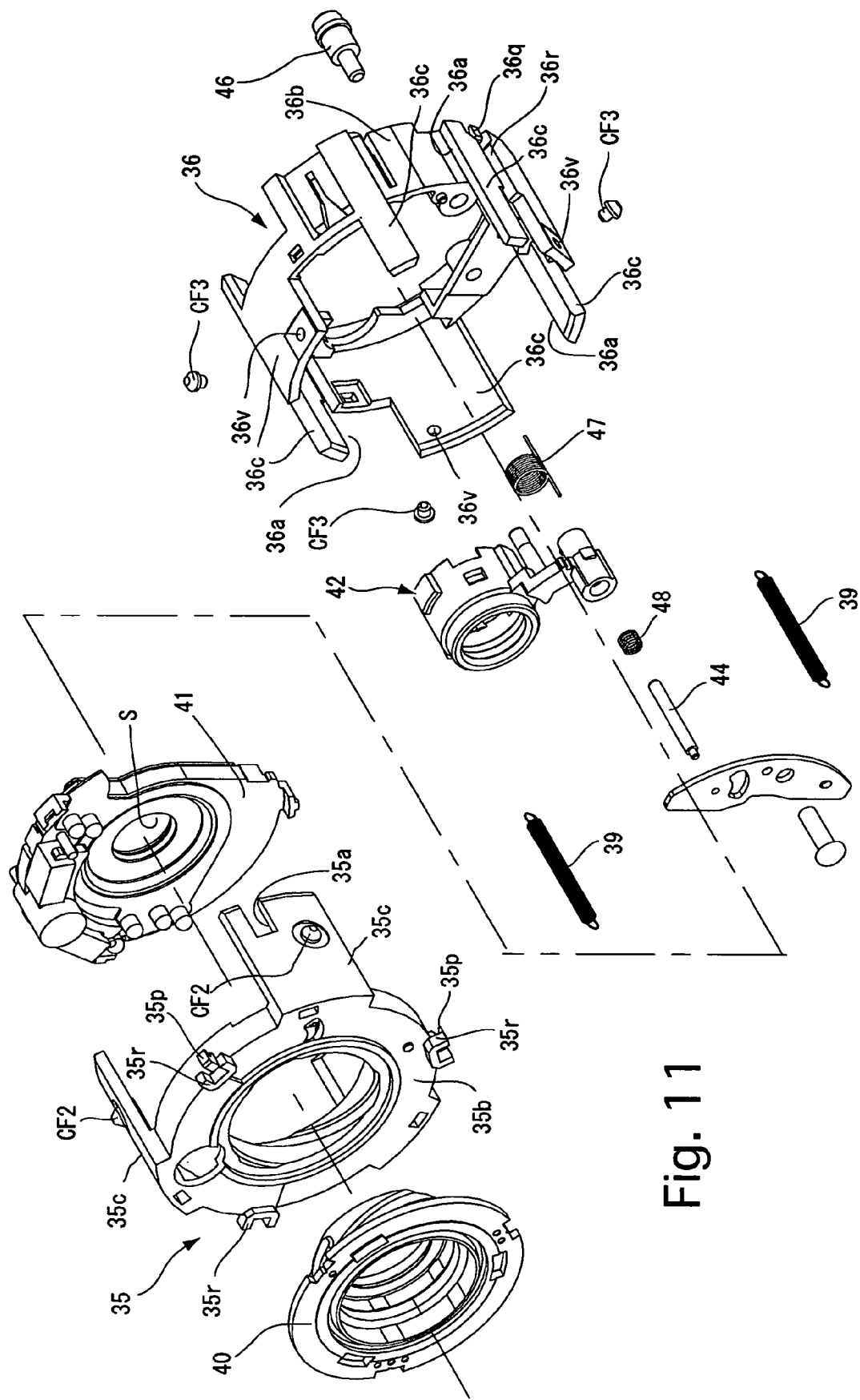
FIG. 11 is an exploded perspective view of a support structure which supports a second lens group and a third lens group of the zoom lens.

The zoom lens 10 is provided inside the stationary barrel 13 with a helicoid ring 25. As shown in FIG. 6, the helicoid ring 25 is provided on an outer peripheral surface thereof with a male helicoid 25a and a set of three rotational guide projections 25b. The male helicoid 25a is engaged with the female helicoid 13a, and the set of three rotational guide projections 25b are engaged in the set of three inclined grooves 13c or the set of three rotational guide grooves 13d, respectively. The helicoid ring 25 is provided on threads of the male helicoid 25a with an annular gear 25c which is in mesh with the zoom gear 22. Therefore, when a rotation of the zoom gear 22 is transferred to the annular gear 25c, the helicoid ring 25 moves forward or rearward in the optical axis direction while rotating about the photographing optical axis Z1 within a predetermined range in which the male helicoid 25a remains in mesh with the female helicoid 13a. A forward movement of the helicoid ring 25 beyond a predetermined point with respect to the stationary barrel 13 causes the male helicoid 25a to be disengaged from the female helicoid 13a so that the helicoid ring 25 rotates about the photographing optical axis Z1 without moving in the optical axis direction relative to the stationary barrel 13 by engagement of the set of three rotational guide projections 25b with the set of three rotational guide grooves 13d. In a state where the female helicoid 13a is in mesh with the male helicoid 25a, the set of three rotational guide projections 25b are positioned in the set of three inclined grooves 13c, respectively, and accordingly, the set of three rotational guide projections 25b and the female helicoid 13a do not interfere with each other.

As can be appreciated from FIGS. 1 through 3, the zoom lens 10 is a telescopic type having three external telescoping barrels: a first external barrel (front movable member/common-engaging spring support member/external member) 37, a second external barrel 34 and a third external barrel 26, which are concentrically arranged about the photographing optical axis Z1. The helicoid ring 25 moves together with the third external barrel 26 in the optical axis direction while rotating about the photographing optical axis Z1. The helicoid ring 25 is provided, on an inner peripheral surface thereof at three different circumferential positions on the helicoid ring 25, with three rotation transfer recesses (engaging recesses) 25d, the front ends of which are open at the front end of the helicoid ring 25. The third external barrel 26 is provided, at corresponding three different circumferential positions on the third external barrel 26, with three pairs of rotation transfer projections (engaging projections) 26a which project rearward from the rear end of the third external barrel 26 to be engageable in the three rotation transfer recesses 25d from the front thereof, respectively (see FIG. 14). The three pairs of rotation transfer projections 26a and the three rotation transfer recesses 25d are movable relative to each other in the direction of the photographing optical axis Z1, and are not rotatable relative to each other about the photographing optical axis Z1. Namely, the helicoid ring 25 and the third external barrel 26 rotate integrally. The helicoid ring 25 is provided, on front faces of the three rotational guide projections 25b at three different circumferential positions on the helicoid ring 25, with a set of three engaging recesses 25e which are formed on an inner peripheral surface of the helicoid ring 25 to be open at the front end of the helicoid ring 25. The third external barrel 26 is provided, at corresponding three different circumferential positions on the third external barrel 26, with a set of three engaging projections 26b which project rearward from the rear end of the third external barrel 26, and which also project radially outwards, to be engaged in the set of three engaging recesses 25e from the front thereof, respectively. The set of three engaging projections 26b, which are respectively engaged in the set of three engaging recesses 25e, are also engaged in the set of three rotational guide grooves 13d at a time, respectively, when the set of three rotational guide projections 25b are engaged in the set of three rotational guide grooves 13d.

The third external barrel 26 and the helicoid ring 25 are biased in opposite directions away from each other in the optical axis direction by compression coil springs (not shown). These compression coil springs are installed between the third external barrel 26 and the helicoid ring 25 in a compressed fashion. Therefore, the set of three engaging projections 26b of the third external barrel 26 are respectively pressed against front guide surfaces of the rotational guide grooves 13d therein by the spring force of the compression coil springs. At the same time, the set of three rotational guide projections 25b of the helicoid ring 25 are respectively pressed against rear guide surfaces of the rotational guide grooves 13d therein by the spring force of the compression coil springs.

Figure 14:
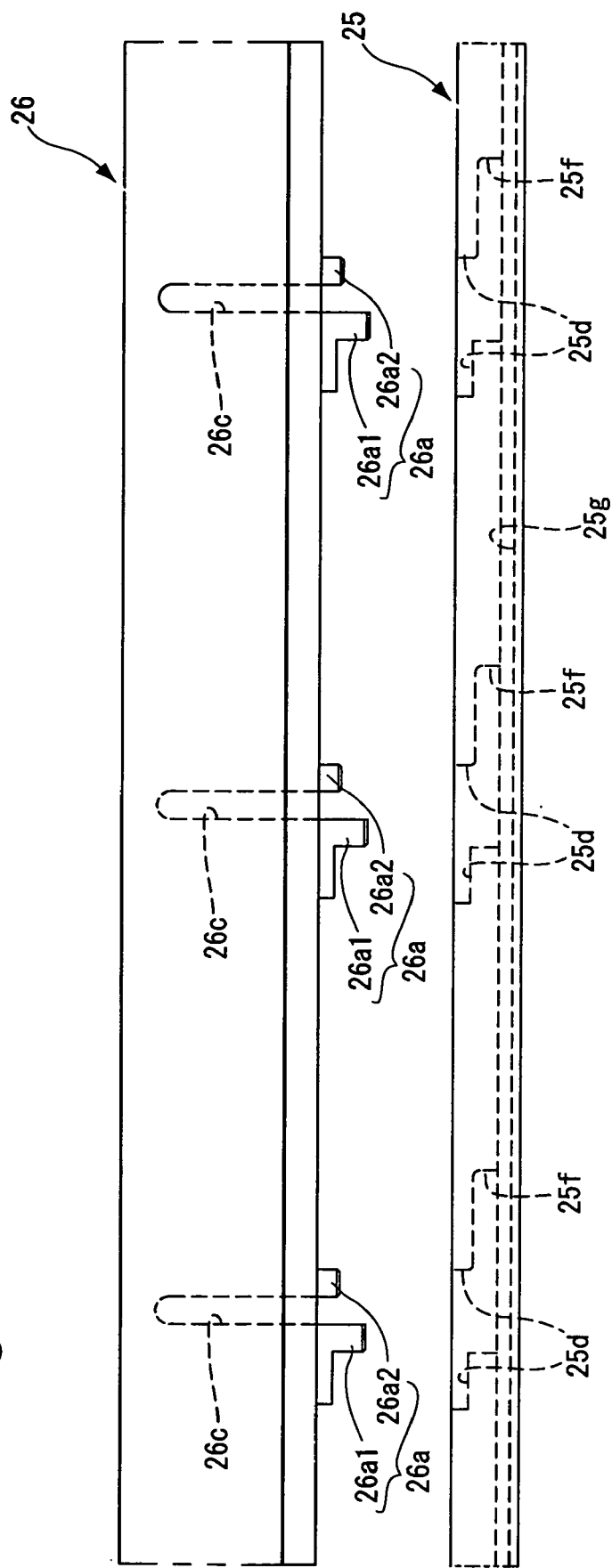
FIG. 14 is a developed view of the helicoid ring and the third external barrel which are shown in FIG. 6.
Figure 19:
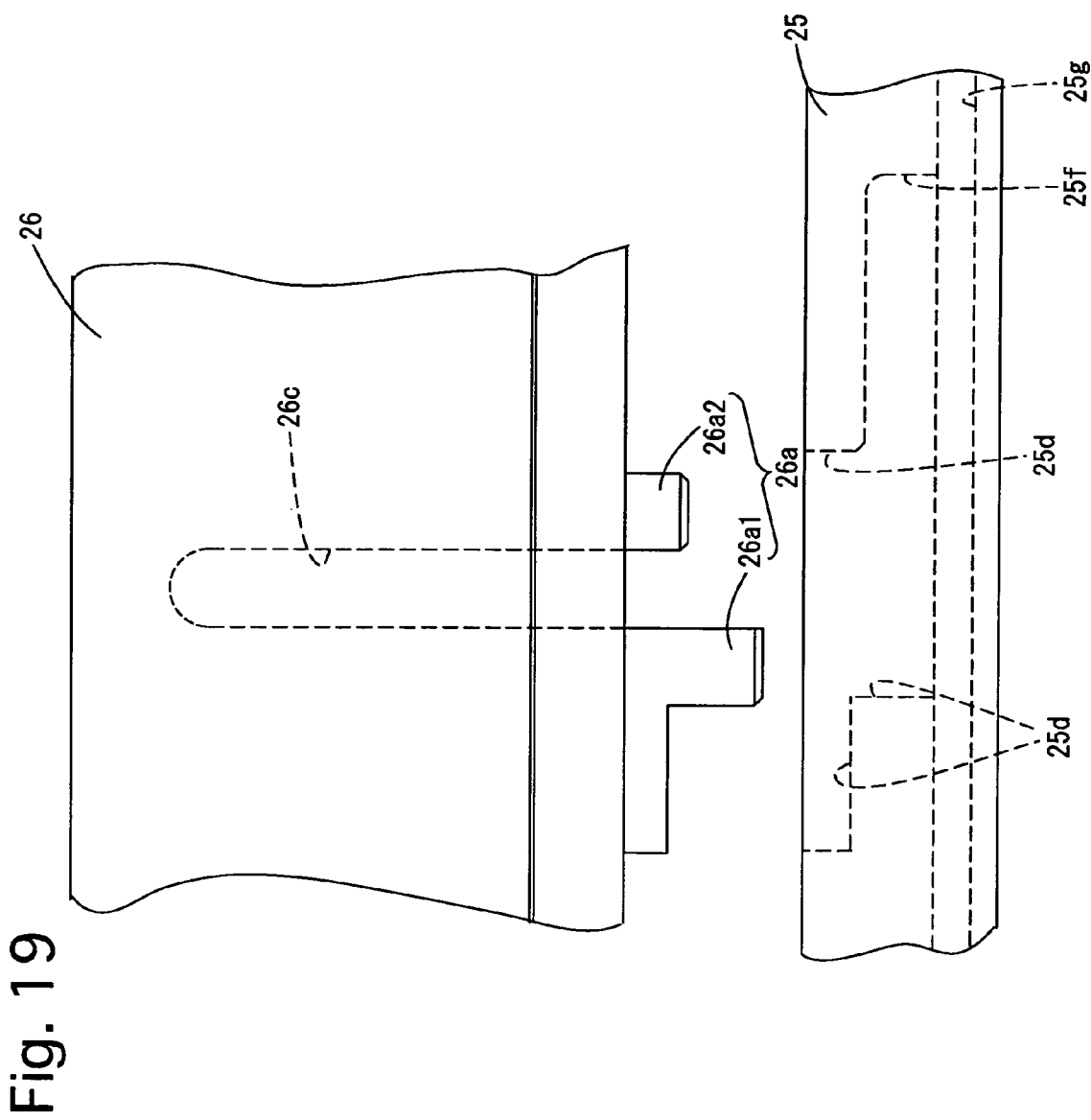
FIG. 19 is a developed view of portions of the helicoid ring and the third external barrel, showing the positional relationship between an engaging recess of the helicoid ring and engaging projections of the third external barrel.
Figure 20:
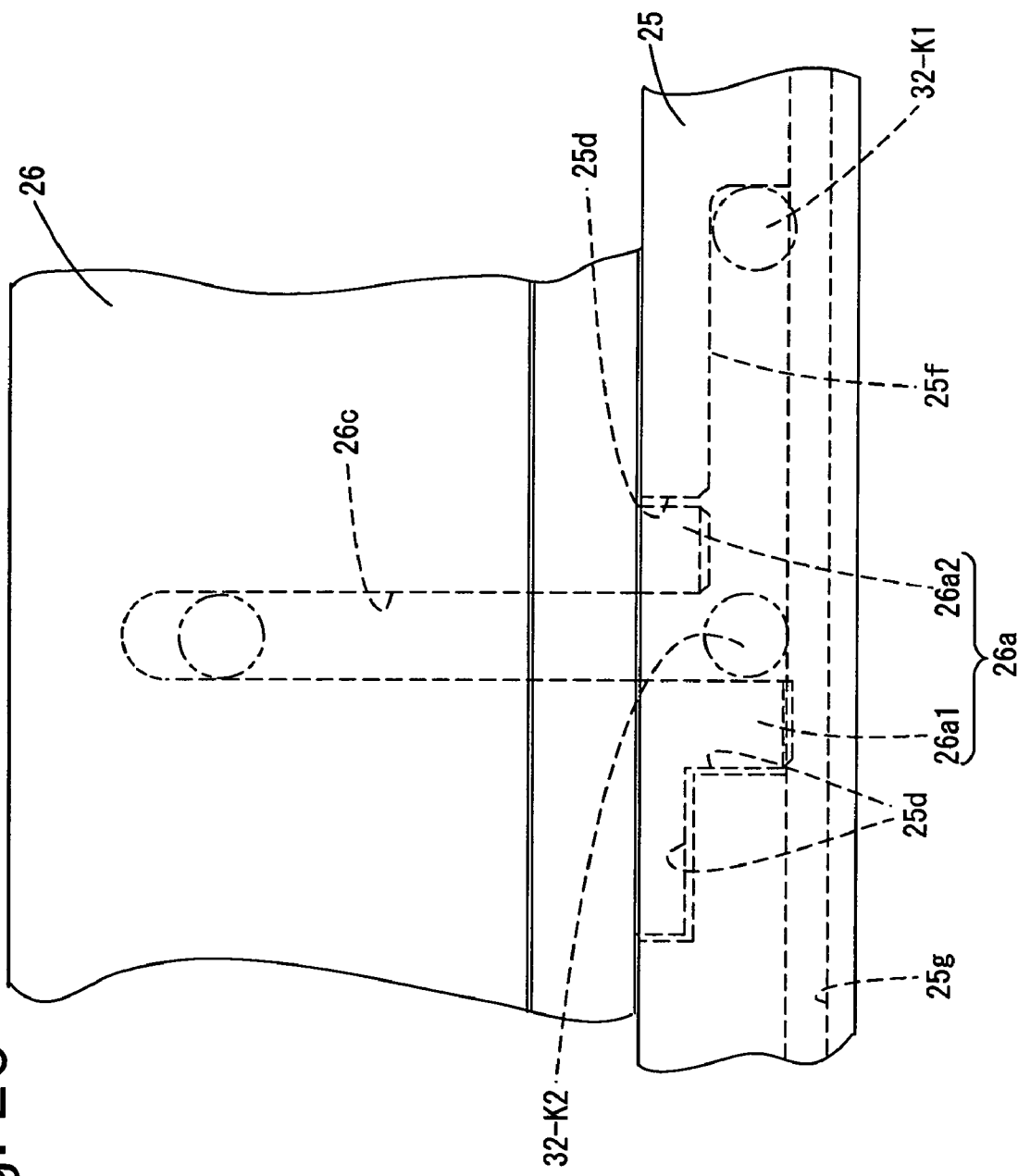
FIG. 20 is a view similar to that of FIG. 19, showing a state of engagement of the engaging recess of the helicoid ring with the engaging projections of the third external barrel.

As shown in FIG. 14, the third external barrel 26 is provided on an inner peripheral surface thereof with a set of three rotation transfer grooves 26c which extend parallel to the photographing optical axis Z1. The front end of each rotation transfer groove 26c is closed at the front end of the third external barrel 26, and the rear end of each rotation transfer groove 26c is open at the rear end of the third external barrel 26. The circumferential positions of the three rotation transfer grooves 26c correspond to those of the three pairs of rotation transfer projections 26a, respectively. More specifically, as shown in FIGS. 14, 19 and 20, each pair of rotation transfer projections 26a consists of a long projection 26a1 and a short projection 26a2 which is smaller than the long projection 26a1 in the amount of projection rearward in the optical axis direction, and the rear end opening of the associated rotation transfer groove 26c is positioned between the long projection 26a1 and the short projection 26a2, and accordingly, surfaces of the long projection 26a1 and the short projection 26a2 which are opposed to each other in a circumferential direction of the third external barrel 26 form a part (the rear end opening) of the associated rotation transfer groove 26c.

On the other hand, the helicoid ring 25 is provided on an inner peripheral surface thereof with a set of three relative rotation allowing grooves 25f which are communicatively connected with the three rotation transfer recesses 25d, respectively. The three relative rotation allowing grooves 25f extend circumferentially on a circle about the photographing optical axis Z1, and one end (left end as viewed in FIG. 14) of each relative rotation allowing groove 25f is communicatively connected with the associated rotation transfer recess 25d, and the other end (right end as viewed in FIG. 14) of each relative rotation allowing groove 25f is formed as a closed end. In a state where the helicoid ring 25 and the third external barrel 26 are coupled to each other, each relative rotation allowing groove 25f is communicatively connected with the rear end opening (the right side surface of the associated long projection 26a1 as viewed in FIG. 20) of the associated rotation transfer groove 26c so that the relative rotation allowing groove 25f and the rotation transfer groove 26c together form an L-shaped groove as shown in FIG. 20.

Figure 13:
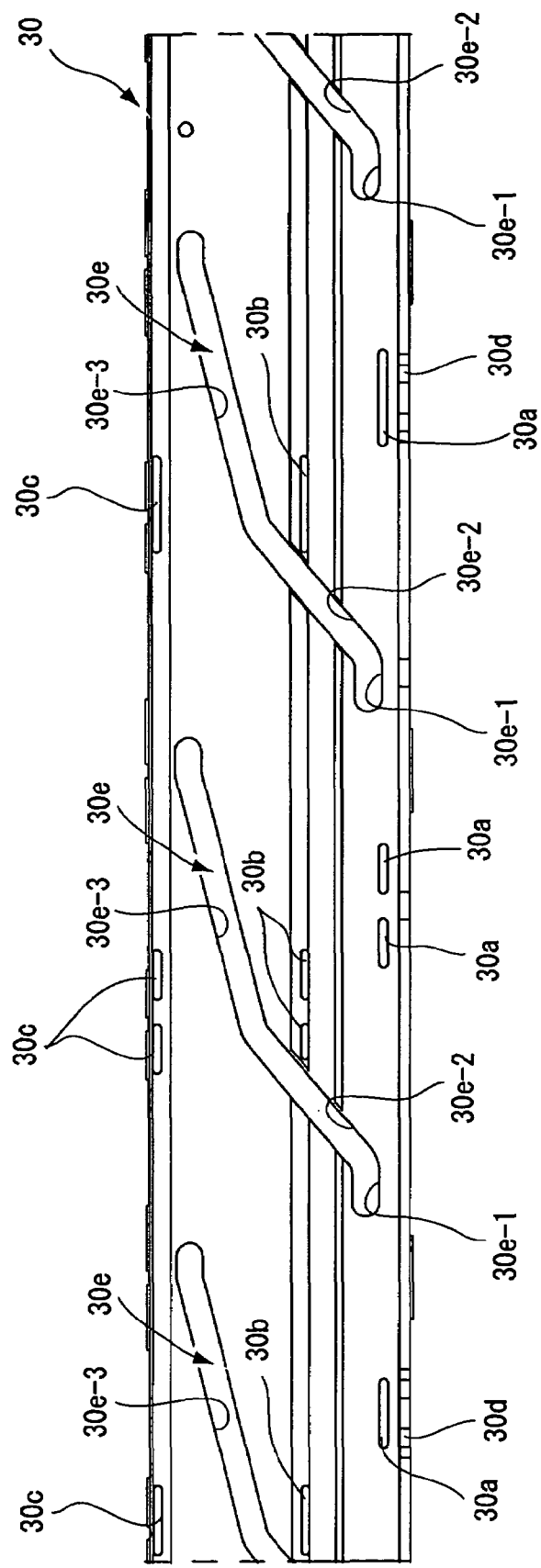
FIG. 13 is a developed view of the first linear guide ring shown in FIG. 6.

The zoom lens 10 is provided inside of the third external barrel 26 and the helicoid ring 25 with a first linear guide ring 30. The helicoid ring 25 is provided on an inner peripheral surface thereof with a circumferential groove 25g which extends in a circumferential direction about the photographing optical axis Z1, and the third external barrel 26 is provided, on an inner peripheral surface thereof in the vicinity of the rear end and the front end of the third external barrel 26, with a rear circumferential groove 26d and a front circumferential groove 26e, respectively, each of which extends in a circumferential direction about the photographing optical axis Z1 (see FIG. 6). As shown in FIGS. 6 and 13, the first linear guide ring 30 is provided on an outer peripheral surface thereof with a first plurality of relative rotation guide projections 30a, a second plurality of relative rotation guide projections 30b and a third plurality of relative rotation guide projections 30c, in that order from the rear of the first linear guide ring 30 in the optical axis direction. The first plurality of relative rotation guide projections 30a, the second plurality of relative rotation guide projections 30b and the third plurality of relative rotation guide projections 30c are engaged in the circumferential groove 25g, the rear circumferential groove 26d and the front circumferential groove 26e, respectively. Due to this engagement, the helicoid ring 25 and the third external barrel 26 are supported by the first linear guide ring 30 to be allowed to rotate relative to the first linear guide ring 30 and to be prevented from moving in the optical axis direction relative to the first linear guide ring 30. In addition, the helicoid ring 25 and the third external barrel 26 are prevented from being separated totally from each other in the optical axis direction via the first linear guide ring 30. The first linear guide ring 30 is provided, in the vicinity of the rear end thereof at different circumferential positions, with a set of three linear guide projections 30d which project radially outwards. The first linear guide ring 30 is guided linearly in the optical axis direction without rotating by the engagement of the set of three linear guide projections 30d with the set of three linear guide grooves 13b of the stationary barrel 13.

The first linear guide ring 30 is provided with a set of three through slots 30e which radially extend through the first linear guide ring 30. As shown in FIG. 13, each through slot 30e includes a circumferential slot portion 30e-1 which extends in a circumferential direction of the first linear guide ring 30, a first lead slot portion 30e-2 which extends obliquely from one end (right end as viewed in FIG. 13) of the circumferential slot portion 30e-1, and a second lead slot portion 30e-3 which extends obliquely from one end (right end as viewed in FIG. 13) of the first lead slot portion 30e-2. The angle of inclination of the first lead slot portion 30e-2 relative to the circumferential direction of the first linear guide ring 30 is greater than that of the second lead slot portion 30e-3. The zoom lens 10 is provided with a cam ring (common driving member) 31 a front part of which is fitted in the first external barrel 37. A set of three roller followers 32 fixed to an outer peripheral surface of the cam ring 31 at different circumferential positions thereon are engaged in the set of three through slots 30e, respectively. The set of three roller followers 32 are further engaged in the set of three rotation transfer grooves 26c (or the set of three relative rotation allowing grooves 25f) through the set of three through slots 30e, respectively.

Advancing operations of movable elements of the zoom lens 10 from the stationary barrel 13 to the cam ring 31 will be discussed hereinafter. Rotating the zoom gear 22 in a lens barrel advancing direction by the zoom motor 23 causes the helicoid ring 25 to move forward while rotating due to engagement of the female helicoid 13a with the male helicoid 25a. This rotation of the helicoid ring 25 causes the third external barrel 26 to move forward together with the helicoid ring 25 while rotating together with the helicoid ring 25, and further causes the first linear guide ring 30 to move forward together with the helicoid ring 25 and the third external barrel 26 because each of the helicoid ring 25 and the third external barrel 26 is coupled to the first linear guide ring 30, to allow respective relative rotations between the third external barrel 26 and the first linear guide ring 30 and between the helicoid ring 25 and the first linear guide ring 30 and to be movable together along a direction of a common rotational axis (i.e., the photographing optical axis Z1), due to the engagement of the first plurality of relative rotation guide projections 30a with the circumferential groove 25g, the engagement of the second plurality of relative rotation guide projections 30b with the rear circumferential groove 26d, and the engagement of the third plurality of relative rotation guide projections 30c with the front circumferential groove 26e.

Figure 15:
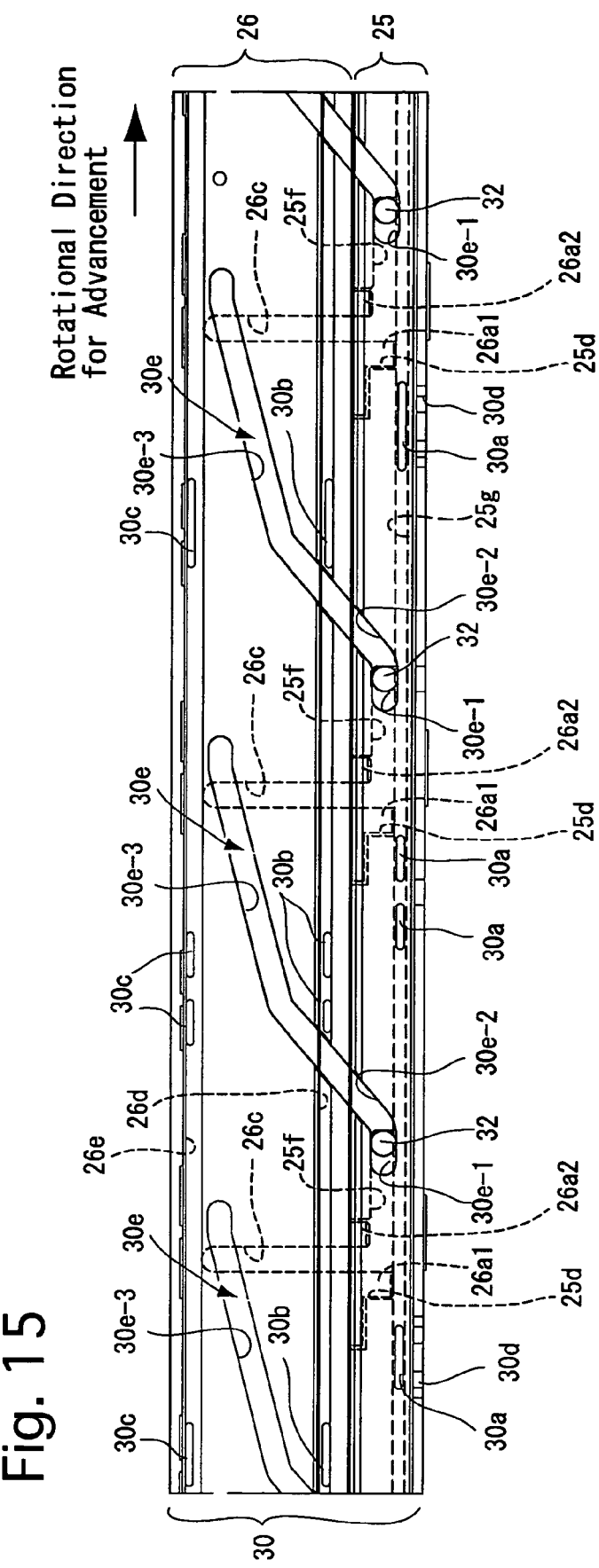
FIG. 15 is a developed view of a set of roller followers fixed to the cam ring, the first linear guide ring, the helicoid ring and the third external barrel, showing the positional relationship thereamong in the retracted state of the zoom lens.
Figure 17:
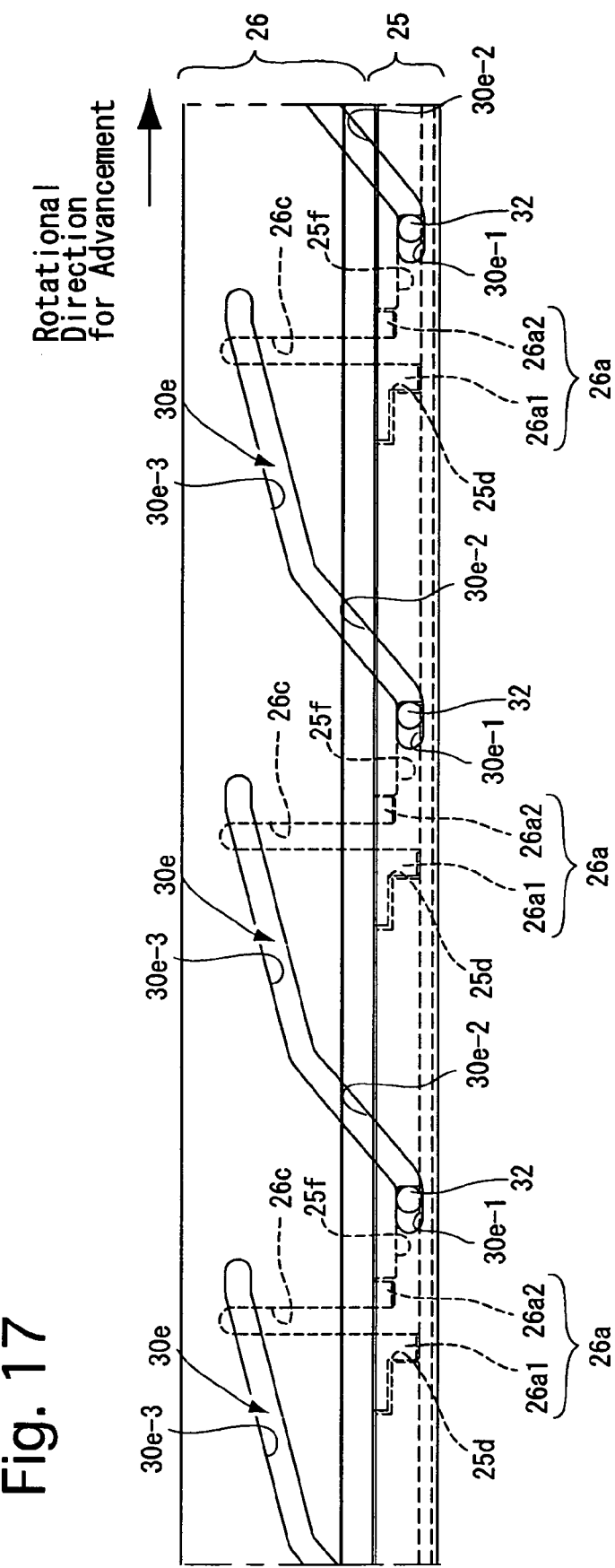
FIG. 17 is a view similar to that of FIG. 15, showing a state where the first linear guide ring has been removed.

In the retracted state of the zoom lens 10, the set of three roller followers 32 are engaged in the circumferential slot portions 30e-1 of the set of three through slots 30e, respectively, and are further engaged in the three relative rotation allowing grooves 25f at closed end portions thereof, respectively, as shown in FIGS. 15 and 17. FIGS. 15 and 17 show the same state, although the first linear guide ring 30 is removed in FIG. 17 except the set of three through slots 30e for the purpose of making the operation of each roller follower 32 easier to be seen in the drawing. In addition, in FIGS. 15 and 17, the first linear guide ring 30 (the set of three through slots 30e) are shown by solid lines though actually positioned a hidden position below (radially inside) the helicoid ring 25 and the third external barrel 26.

When the helicoid ring 25 and the third external barrel 26 are moved forward while rotating, this rotation of the helicoid ring 25 and the third external barrel 26 is not transferred to the cam ring 31 in an initial stage of the forward movement of the helicoid ring 25 and the third external barrel 26 because the set of three roller followers 32 are engaged in the set of three relative rotation allowing grooves 25f, respectively. The set of three roller followers 32 move together with the helicoid ring 25, the third external barrel 26 and the first linear guide ring 30 in the optical axis direction due to the engagement of the set of three roller followers 32 with the circumferential slot portions 30e-1 of the set of three through slots 30e, respectively. Accordingly, in an initial stage of the advancing operation of the zoom lens 10 from the retracted state of the zoom lens 10, the cam ring 31 is moved forward in the optical axis direction without rotating.

Figure 16:
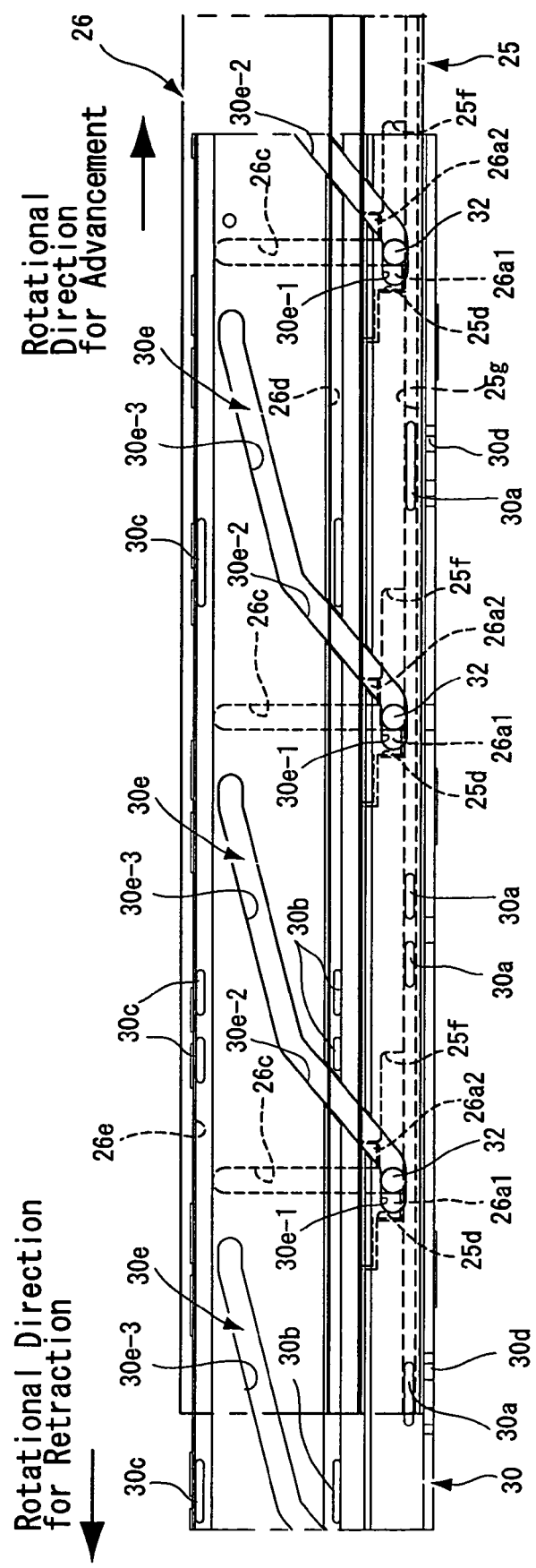
FIG. 16 is a view similar to that of FIG. 15, showing the positional relationship among the set of roller followers, the first linear guide ring, the helicoid ring and the third external barrel, in a state where the zoom lens has been slightly extended forward from the retracted state of the zoom lens.
Figure 18:
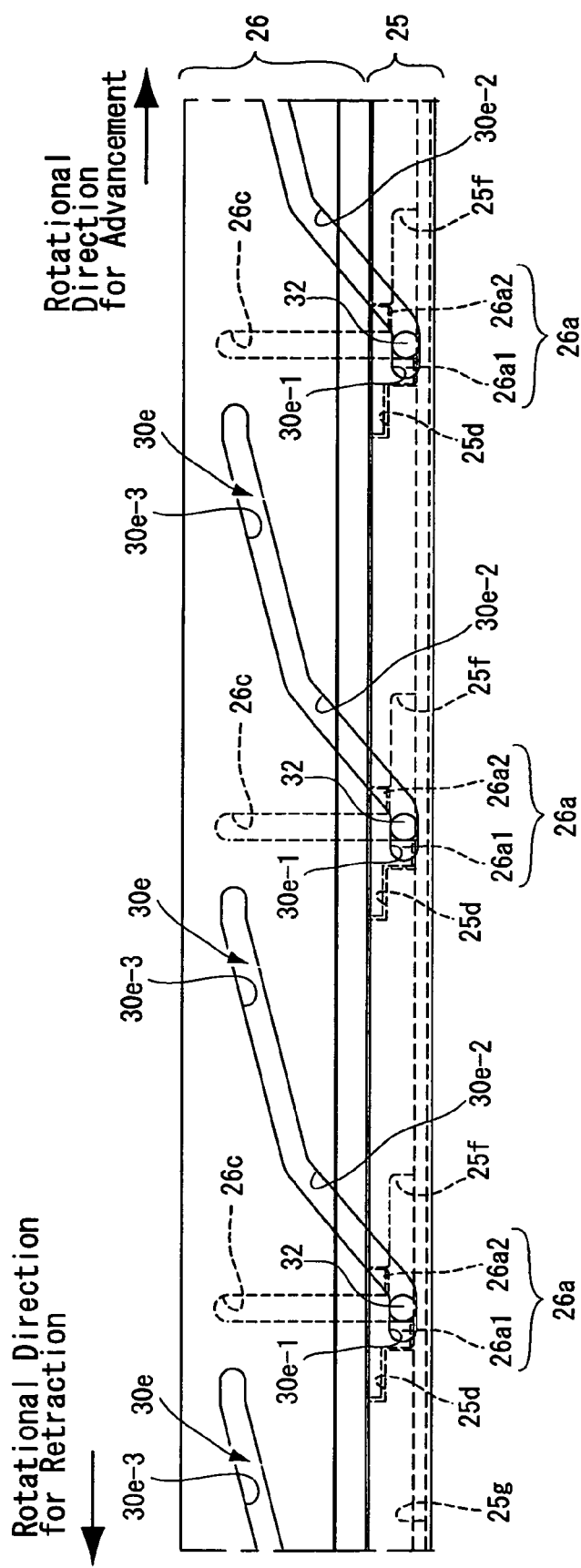
FIG. 18 is a view similar to that of FIG. 16, showing a state where the first linear guide ring has been removed.

FIGS. 16 and 18 show a state of the helicoid ring 25 and the third external barrel 26 which have been rotated by an angle of approximately 30 degrees from their respective retracted positions from the retracted state of the zoom lens 10 shown in FIGS. 15 and 17. In the state shown in FIGS. 16 and 18, each roller follower 32 is engaged in an intersection of the associated relative rotation allowing groove 25f and the associated rotation transfer groove 26c so that the rotation of the helicoid ring 25 and the third external barrel 26 can be transferred to the roller follower 32 via a side surface (left surface as viewed in FIG. 20) of the rotation transfer groove 26c at the left end of the relative rotation allowing groove 25f. A further forward movement of the helicoid ring 25 and the third external barrel 26 while rotating causes each roller follower 32 to be moved rightward as viewed in FIGS. 16 and 18 from the circumferential slot portions 30e-1 to the first lead slot portion 30e-2 of the associated through slot 30e. Since the first lead slot portion 30e-2 of each through slot 30e is inclined to the circumferential direction of the first linear guide ring 30 in a manner to approach the front end (upper end as viewed in FIG. 16) of the first linear guide ring 30 in a direction away from the circumferential slot portions 30e-1 of the associated through slot 30e, a forward movement of each roller follower 32 in the first lead slot portion 30e-2 of the associated through slot 30e causes the roller follower 32 to be disengaged from the associated relative rotation allowing groove 25f to be engaged in the associated rotation transfer groove 26c (i.e., the roller follower 32 is led from the associated relative rotation allowing groove 25f to the associated rotation transfer groove 26c). In a state where the set of three roller followers 32 are engaged in the set of three rotation transfer grooves 26c, respectively, the torque (rotating force) of the third external barrel 26 is transferred to the cam ring 31 via the engagement of the set of three roller followers 32 with the set of three rotation transfer grooves 26c whenever the third external barrel 26 rotates. Thereupon, the cam ring 31 moves forward while rotating relative to the first linear guide ring 30 in accordance with contours of the first lead slot portions 30e-2 of the set of three through slots 30e. At this time, each roller follower 32 moves forward in the optical axis direction in the associated rotation transfer groove 26c while receiving a torque from the same rotation transfer groove 26c. Since the first linear guide ring 30 itself has linearly moved forward together with the helicoid ring 25 and the third external barrel 26 as described above, the cam ring 31 moves forward in the optical axis direction by a resultant amount of movement corresponding to the sum of the amount of the forward movement of the first linear guide ring 30 (and the helicoid ring 25 and the third external barrel 26) and the amount of the forward movement of the cam ring 31 via the engagement of the set of three roller followers 32 with the first lead slot portions 30e-2 of the set of three through slots 30e, respectively.

The above described rotating-advancing operations of the helicoid ring 25 and the third external barrel 26 are performed only when the male helicoid 25a and the female helicoid 13a are engaged with each other. At this time, the set of three rotational guide projections 25b are moving in the set of three inclined grooves 13c, respectively. When the helicoid ring 25 is moved forward by a predetermined amount of movement, the male helicoid 25a and the female helicoid 13a are disengaged from each other so that the set of three rotational guide projections 25b move from the set of three inclined grooves 13c into the set of three rotational guide grooves 13d, respectively. Since the helicoid ring 25 does not move in the optical axis direction relative to the stationary barrel 13 even if rotating upon the disengagement of the male helicoid 25a from the female helicoid 13a, the helicoid ring 25 and the third external barrel 26 rotate at respective axial fixed positions thereof without moving in the optical axis direction due to the slidable engagement of the set of three rotational guide projections 25b with the set of three rotational guide grooves 13d.

Furthermore, after a lapse of a predetermined period of time from the moment at which the set of three rotational guide projections 25b slide into the set of three rotational guide grooves 13d from the set of three inclined grooves 13c, respectively, the set of three roller followers 32 enter the second lead slot portions 30e-3 from the first lead slot portions 30e-2 of the set of three through slots 30e, respectively. Since the second lead slot portion 30e-3 of each through slot 30e is inclined to the first linear guide ring 30 in a direction away from the associated first lead slot portion 30e-2 and approaching the front end (upper end as viewed in FIG. 16) of the first linear guide ring 30, further rotation of the helicoid ring 25 and the third external barrel 26 at respective axial fixed positions thereof in a lens barrel advancing direction causes each roller follower 32 to move forward in the second lead slot portion 30e-3 of the associated through slot 30e. Namely, the cam ring 31 is moved forward while rotating relative to the first linear guide ring 30 in accordance with contours of the second lead slot portions 30e-3 of the set of three through slots 30e. The helicoid ring 25 and the third external barrel 26 serve as a rotating drive member which transfers torque to the cam ring 31 via the engagement of the set of three roller followers 32 with the set of three through slots 30e and the engagement of the set of three roller followers 32 with the set of three rotation transfer grooves 26c.

Rotating the zoom gear 22 in a lens barrel retracting direction thereof via the zoom motor 23 causes the aforementioned movable elements of the zoom lens 10 from the stationary barrel 13 to the cam ring 31 to operate in the reverse manner to the above described advancing operations. In this reverse operation, the helicoid ring 25 and the third external barrel 26 which rotate at respective axial fixed positions thereof move rearward in the optical axis direction while rotating after the male helicoid 25a and the female helicoid 13a are engaged with each other. The first linear guide ring 30 linearly moves in the optical axis direction without rotating at all times while following the rearward linear movement of the helicoid ring 25 and the third external barrel 26. When the set of three roller followers 32 are engaged in the first lead slot portions 30e-2 or the second lead slot portions 32e-3 of the set of three through slots 30e, respectively, the cam ring 31 moves rearward in the optical axis direction relative to the helicoid 25, the third external barrel 26 and the first linear guide ring 30 by rotation of the helicoid ring 25 and the third external barrel 26 in the lens barrel retracting direction thereof. At this time, each roller follower 32 moves rearward in the optical axis direction in the associated rotation transfer groove 26c while receiving a torque from the same rotation transfer groove 26c. Thereafter, upon moving into the circumferential slot portions 30e-1 from the first lead slot portion 30e-2 of the associated through slot 30e, each roller follower 32 is disengaged from the associated rotation transfer groove 26c at the rear opening end thereof to be engaged in the associated relative rotation allowing groove 25f. At this time, the rotation of the helicoid ring 25 and the third external barrel 26 stops being transferred to the set of three roller followers 32, and accordingly, the cam ring 31 is moved rearward in the optical axis direction without rotating together with the helicoid ring 25, the third external barrel 26 and the first linear guide ring 30. Each roller follower 32 moves in the associated relative rotation allowing groove 25f, and the zoom lens 10 falls into the retracted position thereof upon each roller follower 32 reaching the closed end (right end as viewed in FIG. 14) of the associated relative rotation allowing groove 25f.

The structure of the zoom lens 10 radially inside of the cam ring 31 will be discussed hereinafter. As shown in FIG. 6, the first linear guide ring 30 is provided on an inner peripheral surface thereof with a set of three pairs of first linear guide grooves 30f which are formed at different circumferential positions to extend parallel to the photographing optical axis Z1, and a set of six second linear guide grooves 30g which are formed at different circumferential positions to extend parallel to the photographing optical axis Z1. Each pair of first linear guide grooves 30f are respectively positioned on the opposite sides of the associated second linear guide groove 30g (every second linear guide groove 30g) in a circumferential direction of the first linear guide ring 30. The zoom lens 10 is provided inside of the first linear guide ring 30 with a second linear guide ring (linear guide member) 33. The second linear guide ring 33 is provided on an outer edge thereof with a set of three bifurcated projections 33a (see FIGS. 7 through 10 and 24) which project radially outwards from a ring portion 33b of the second linear guide ring 33. Each bifurcated projection 33a is provided at a radially outer end thereof with a pair of radial projections which are respectively engaged in the associated pair of first linear guide grooves 30f. On the other hand, a set of six radial projections 34a (see FIG. 12) which are formed on an outer peripheral surface of the second external barrel 34 at a rear end thereof and project radially outwards are engaged in the set of six second linear guide grooves 30g to be slidable therealong, respectively. Therefore, each of the second linear guide ring 33 and the set of six radial projections 34a of the second external barrel 34 is guided in the optical axis direction via the first linear guide ring 30. The zoom lens 10 is provided inside of the cam ring 31 with a second lens group moving frame (intermediate movable member/single-engaging spring support member) 35 which indirectly supports and holds the second lens group LG2. The first external barrel 37 indirectly supports the first lens group LG1, and is positioned inside of the second external barrel 34. The zoom lens 10 is provided radially inside of the cam ring 31 with a third lens group moving frame (rear movable member/single-engaging spring support member) 36. The second linear guide ring 33 serves as a linear guide member for guiding both the second lens group moving frame 35 that supports the second lens group LG2 and the third lens group moving frame 36 that supports the third lens group LG3 linearly without rotating the second lens group moving frame 35 and the third lens group moving frame 36, while the set of six radial projections 34a of the second external barrel 34 serve as linear guide members for guiding the first external barrel 37 linearly without rotating.

Figure 22:
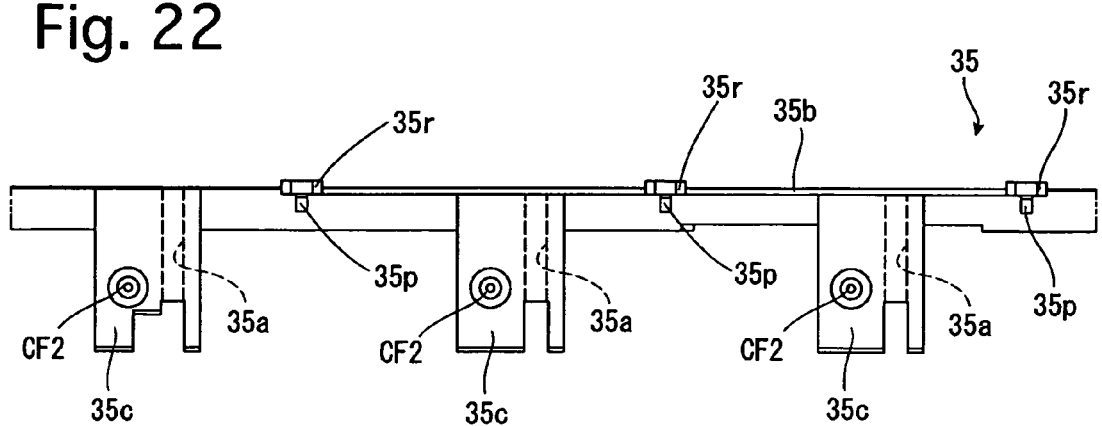
FIG. 22 is a developed view of the second lens group moving frame.
Figure 23:
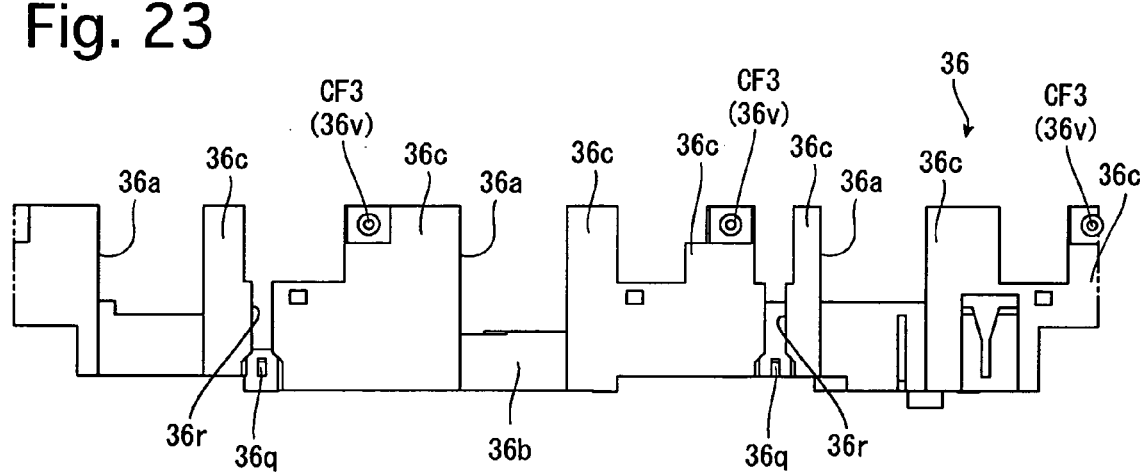
FIG. 23 is a developed view of the third lens group moving frame.
Figure 24:
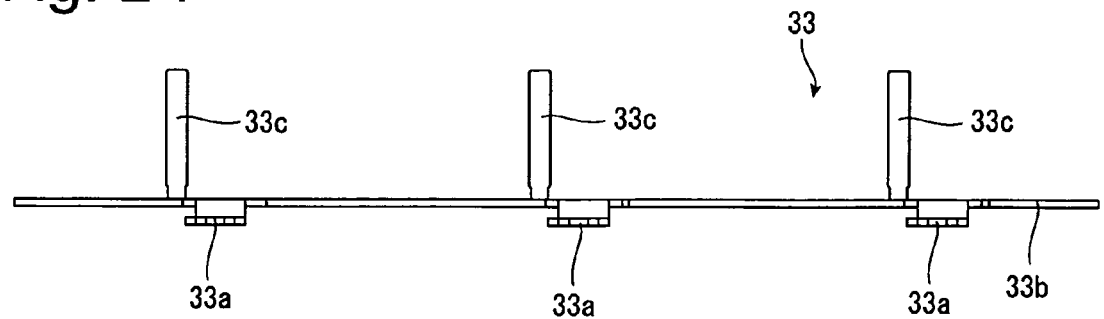
FIG. 24 is a developed view of the second linear guide ring.
Figure 25:
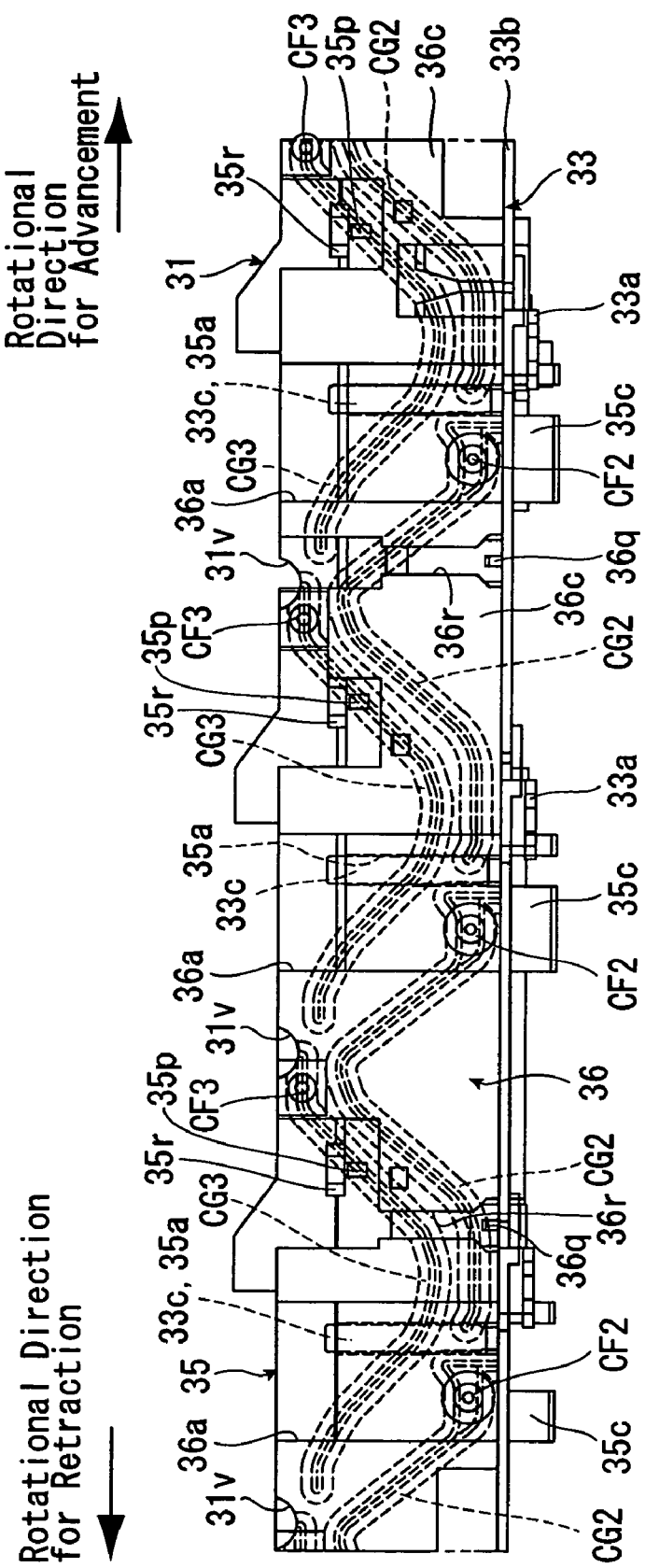
FIG. 25 is a developed view of the second lens group moving frame, the third lens group moving frame, the cam ring and the second linear guide ring, showing the positional relationship thereamong in the retracted state of the zoom lens.

As shown in FIGS. 7 through 10 and 24, the second linear guide ring 33 is provided on the ring portion 33b with a set of three linear guide keys 33c which project forward parallel to one another from the ring portion 33b. As shown in FIGS. 1 through 3, a discontinuous outer edge of the ring portion 33b is engaged in a discontinuous circumferential groove 31a formed on an inner peripheral surface of the cam ring 31 at the rear end thereof to be rotatable about the photographing optical axis Z1 relative to the cam ring 31 and to be immovable relative to the cam ring 31 in the optical axis direction. The set of three linear guide keys 33c project forward from the ring portion 33b into the cam ring 31. The second lens group moving frame 35 is provided with a corresponding set of three guide grooves 35a in which the set of three linear guide keys 33c are engaged, respectively (see FIGS. 25 through 28). As shown in FIG. 22, the second lens group moving frame 35 is further provided with a ring portion 35b having its center on the photographing optical axis Z1, and a set of three rearward projections 35c which project rearward in parallel to one another from the ring portion 35b in the optical axis direction. The aforementioned set of three linear guide grooves 35a are formed on the set of three rearward projections 35c, respectively. The set of three rearward projections 35c are arranged at substantially equi-angular intervals in a circumferential direction of the second lens group moving frame 35. The set of three rearward projections 35c are engaged in a corresponding set of three linear guide grooves 36a formed on an outer peripheral surface of the third lens group moving frame 36 at different circumferential positions to be slidable thereon along the set of three linear guide grooves 36a, respectively (see FIGS. 8, 9 and 25 through 28). As shown in FIG. 23, the third lens group moving frame 36 is provided with a ring portion 36b having its center on the photographing optical axis Z1, and a set of six forward projections 36c which project both radially outwards from the ring portion 36b and forward in parallel to one another from the ring portion 36b in the optical axis direction. Each of the aforementioned set of three linear guide grooves 36a is formed by a combination of an outer peripheral surface of the ring portion 36b (bottom surface of the linear guide groove 36a) and side surfaces of associated adjacent two forward projections 36c on opposite sides of the outer peripheral surface of the ring portion 36b in a circumferential direction thereof. Accordingly, side surfaces of each forward projection 36c, which are positioned on the opposite sides thereof in a circumferential direction of the third lens group moving frame 36 to extend in the optical axis direction, and side surfaces of each rearward projection 35c, which are positioned on the opposite sides thereof in a circumferential direction of the second lens group moving frame 35 to extend in the optical axis direction, serve as linear guide surfaces for guiding the second lens group moving frame 35 and the third lens group moving frame 36 linearly in the optical axis direction to be linearly movable in the optical axis direction relative to each other. The second lens group moving frame 35 and the third lens group moving frame 36 are biased toward each other in the optical axis direction. Due to this structure of engagement between the second lens group moving frame 35 and the third lens group moving frame 36, the second lens group moving frame 35 is guided linearly in the optical axis direction by the second linear guide ring 33, and the third lens group moving frame 36 is guided linearly in the optical axis direction by the second lens group moving frame 35.

As shown in FIGS. 7 through 10 and 21, the cam ring 31 is provided on an inner peripheral surface thereof with a set of three front inner cam grooves (driving device/third cam grooves) CG3, and a set of three rear inner cam grooves (driving device/second cam grooves) CG2 formed behind the set of three front inner cam grooves CG3. The set of three front inner cam grooves CG3 and the set of three rear inner cam grooves CG2 determine the moving manner of the second lens group LG2 and the moving manner of the third lens group LG3, respectively. The second lens group moving frame 35 is provided on outer peripheral surfaces of the set of three rearward projections 35c with a set of three rear cam followers (second cam followers) CF2 which are engaged in the set of three rear inner cam grooves CG2 of the cam ring 31, respectively. The third lens group moving frame 36 is provided on outer peripheral surfaces of three of the six forward projections 36c with a set of three front cam followers (third cam followers) CF3 which are engaged in the set of three front inner cam grooves CG3 of the cam ring 31, respectively. Each of the following four sets of grooves or followers, i.e., the set of three front inner cam grooves CG3, the set of three rear inner cam grooves CG2, the set of three front cam followers CF3 and the set of three rear cam followers CF2, are formed at substantially equi-angular intervals in a circumferential direction about the photographing optical axis Z1. Since each of the second lens group moving frame 35 and the third lens group moving frame 36 is guided linearly in the optical axis direction directly or indirectly by the second linear guide ring 33, a rotation of the cam ring 31 causes the second lens group moving frame 35 and the third lens group moving frame 36 to move in the optical axis direction in a predetermined moving manner in accordance with contours of the set of three rear inner cam grooves CG2 and the front inner cam grooves CG3. This cam mechanism will be discussed in detail later.

The zoom lens 10 is provided with a second lens frame 40 which supports the second lens group LG2. The second lens frame 40 is supported by the ring portion 35b of the second lens group moving frame 35 (see FIG. 11). The second lens frame 40 is fixed to the ring portion 35b of the second lens group moving frame 35 by the engagement of amale screw thread (adjusting screw) formed on an outer peripheral surface of the second lens frame 40 with a female screw thread (adjusting screw) formed on an inner peripheral surface of the second lens group moving frame 40. The male screw thread of the second lens frame 40 and the female screw thread of the second lens group moving frame 35 are formed with respective centers thereof on the photographing optical axis Z1. Accordingly, the position of the second lens frame 40 relative to the second lens group moving frame 35 in the optical axis direction can be adjusted by rotating the second lens frame 40 relative to the second lens group moving frame 35.

The zoom lens 10 is provided between the second and third lens groups LG2 and LG3 with a shutter unit 41 including the shutter S. The shutter unit 41 is positioned radially inside of the third lens group moving frame 36 to be supported thereby. An actuator for driving the shutter S is incorporated in the shutter unit 41.

Figure 31:
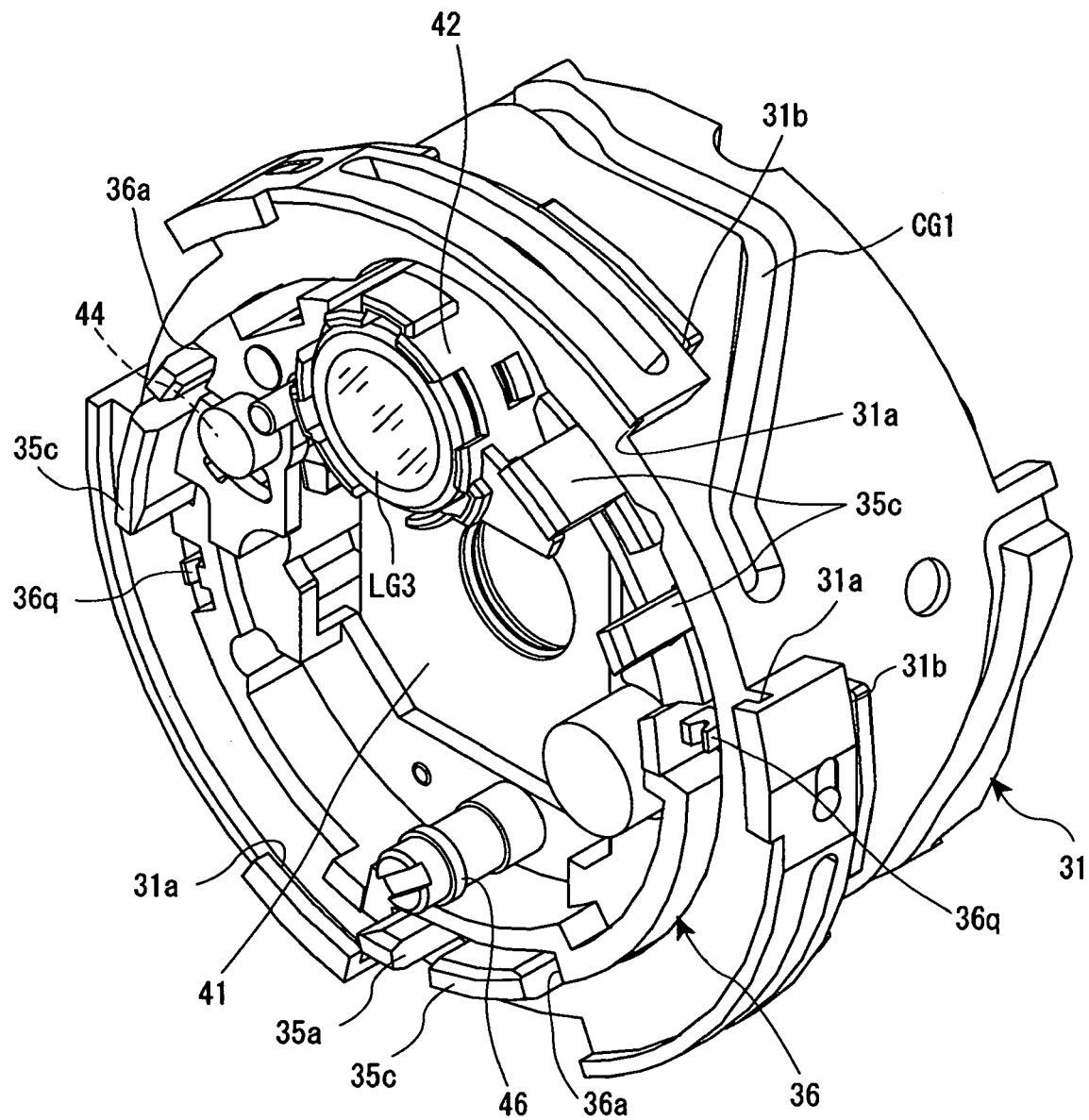
FIG. 31 is a perspective view of the cam ring, the third lens group moving frame and the third lens frame in the retracted state of the zoom lens, viewed obliquely from behind.
Figure 32:
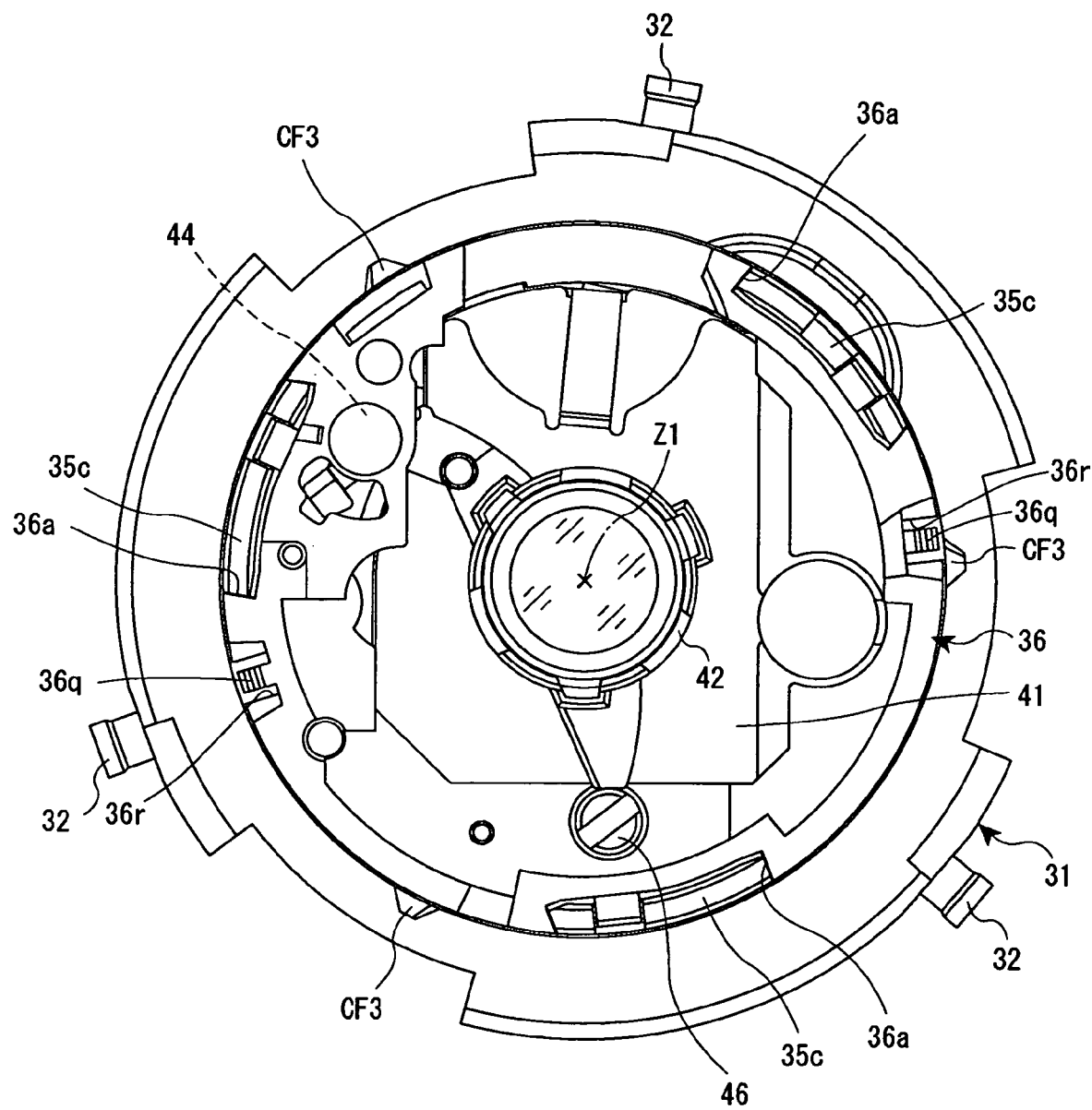
FIG. 32 is a rear elevational view of the cam ring, the third lens group moving frame and the third lens frame in the state shown in FIG. 30, in which the third lens frame is held in the photographing position thereof.
Figure 33:
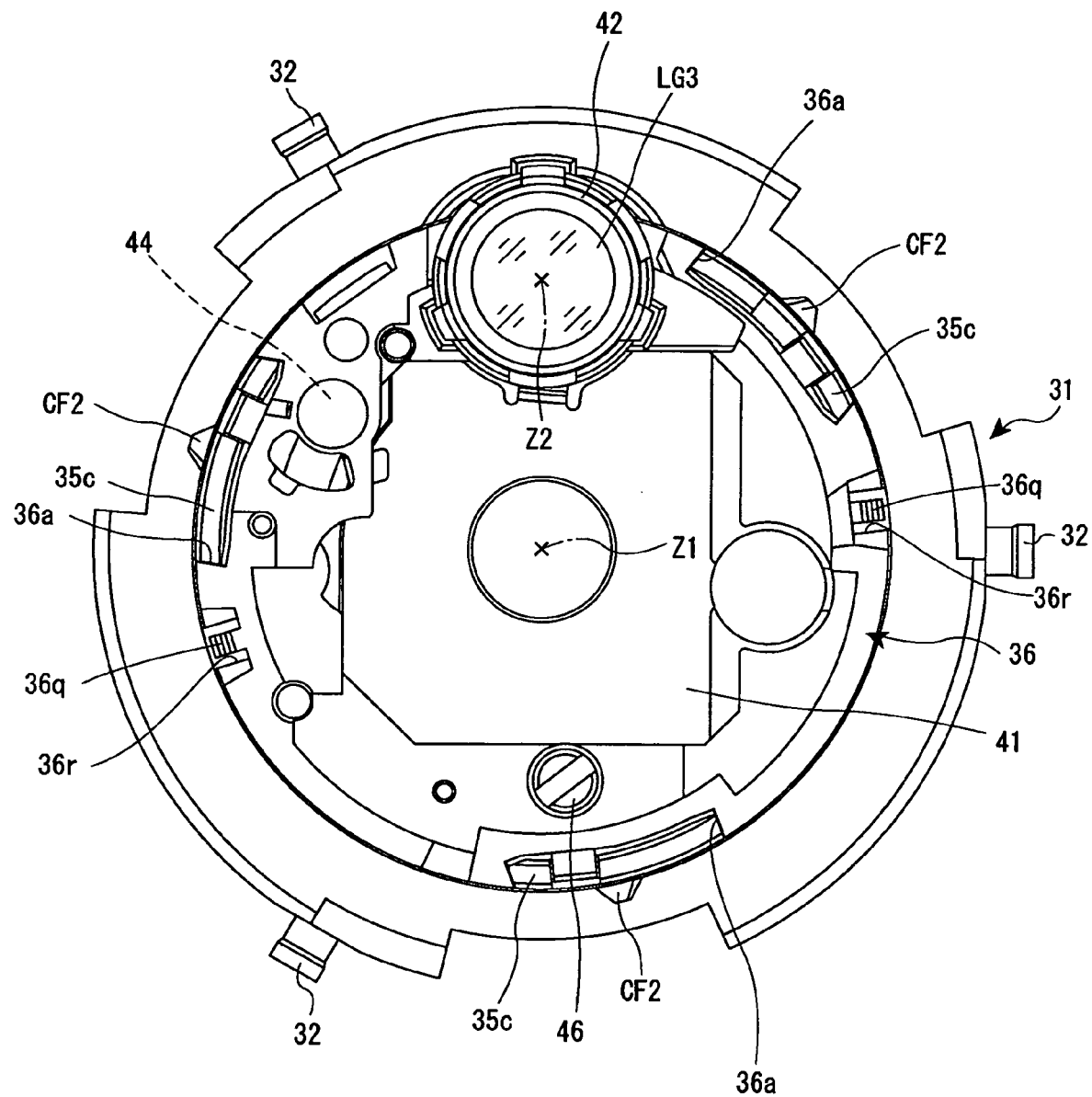
FIG. 33 is a rear elevational view of the cam ring, the third lens group moving frame and the third lens frame in the state shown in FIG. 31, in which the third lens frame is held in the radially-retracted position thereof.

The zoom lens 10 is provided inside of the third lens group moving frame 36 with a third lens frame (radially-retractable lens frame) 42 which supports and holds the third lens group LG3 to be positioned behind the shutter unit 41. The third lens frame 42 is pivoted about a pivot shaft 44 which is fixed to the third lens group moving frame 36 to project forward. The pivot shaft 44 is positioned a predetermined distance away from the photographing optical axis Z1, and extends parallel to the photographing optical axis Z1. The third lens frame 42 is swingable about the pivot shaft 44 between a photographing position shown in FIGS. 1, 2, 30 and 32 where the optical axis of the third lens group LG3 coincides with the photographing optical axis Z1 and a radially-retracted position shown in FIGS. 3, 31 and 33 where the optical axis of the third lens group LG3 is positioned at a radially retracted optical axis Z2 (FIGS. 3 and 33). A rotation limit pin (stop pin) 46, which prevents the third lens frame 42 from rotating clockwise as viewed in FIG. 32 beyond a predetermined point to determine the photographing position of the third lens frame 42, is fixed to the third lens group moving frame 36. The third lens frame 42 is biased to rotate in a direction (clockwise as viewed in FIG. 32) to come into contact with the rotation limit pin 46 by a torsion coil spring 47. A compression coil spring 48 is fitted on the pivot shaft 44 to bias the third lens frame 42 rearward in the optical axis direction to remove backlash between the third lens frame 42 and the third lens group moving frame 36.

Figure 29:
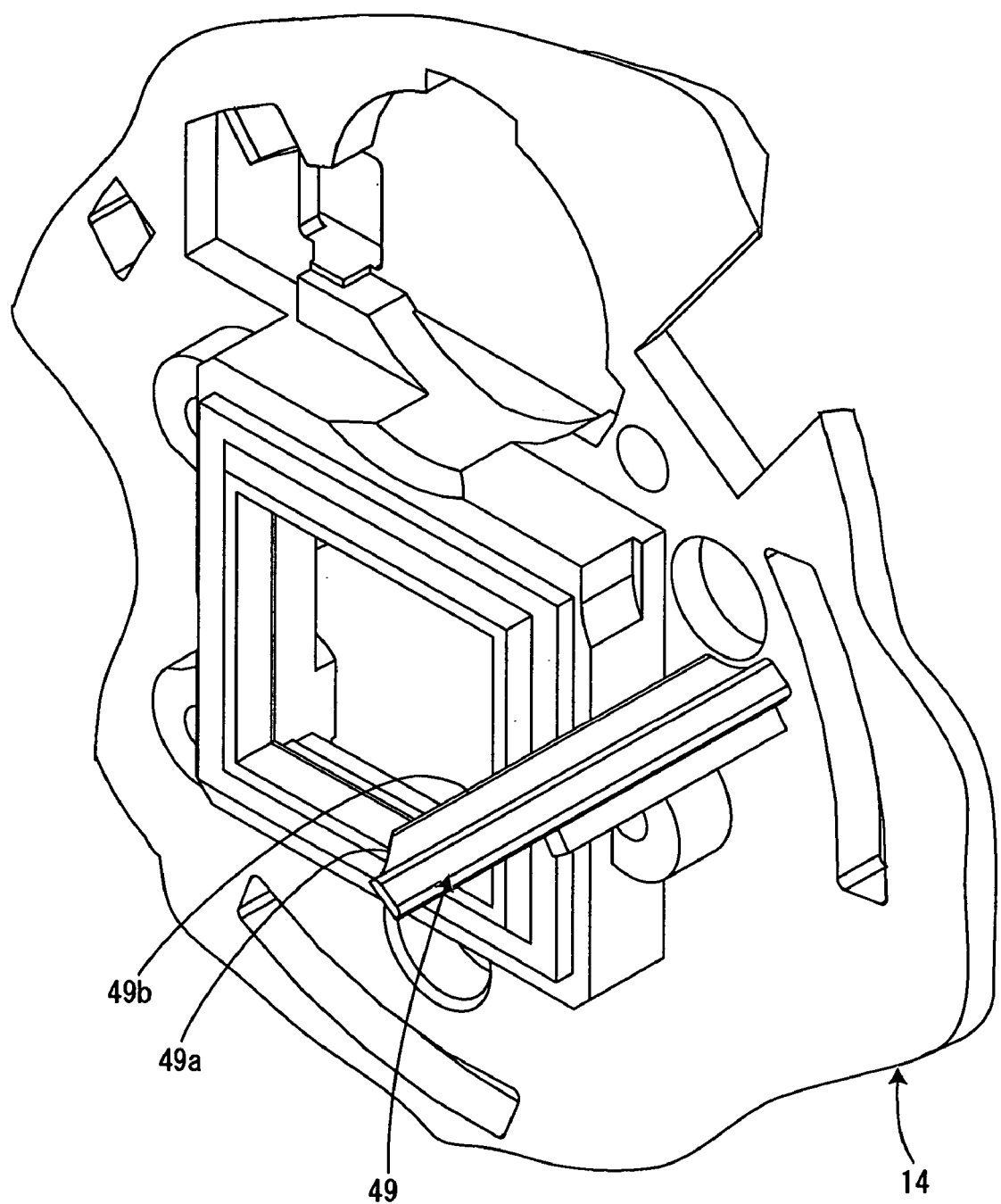
FIG. 29 is a perspective view of a portion of the CCD holder in the vicinity of a position-control cam bar thereof.
Figure 30:
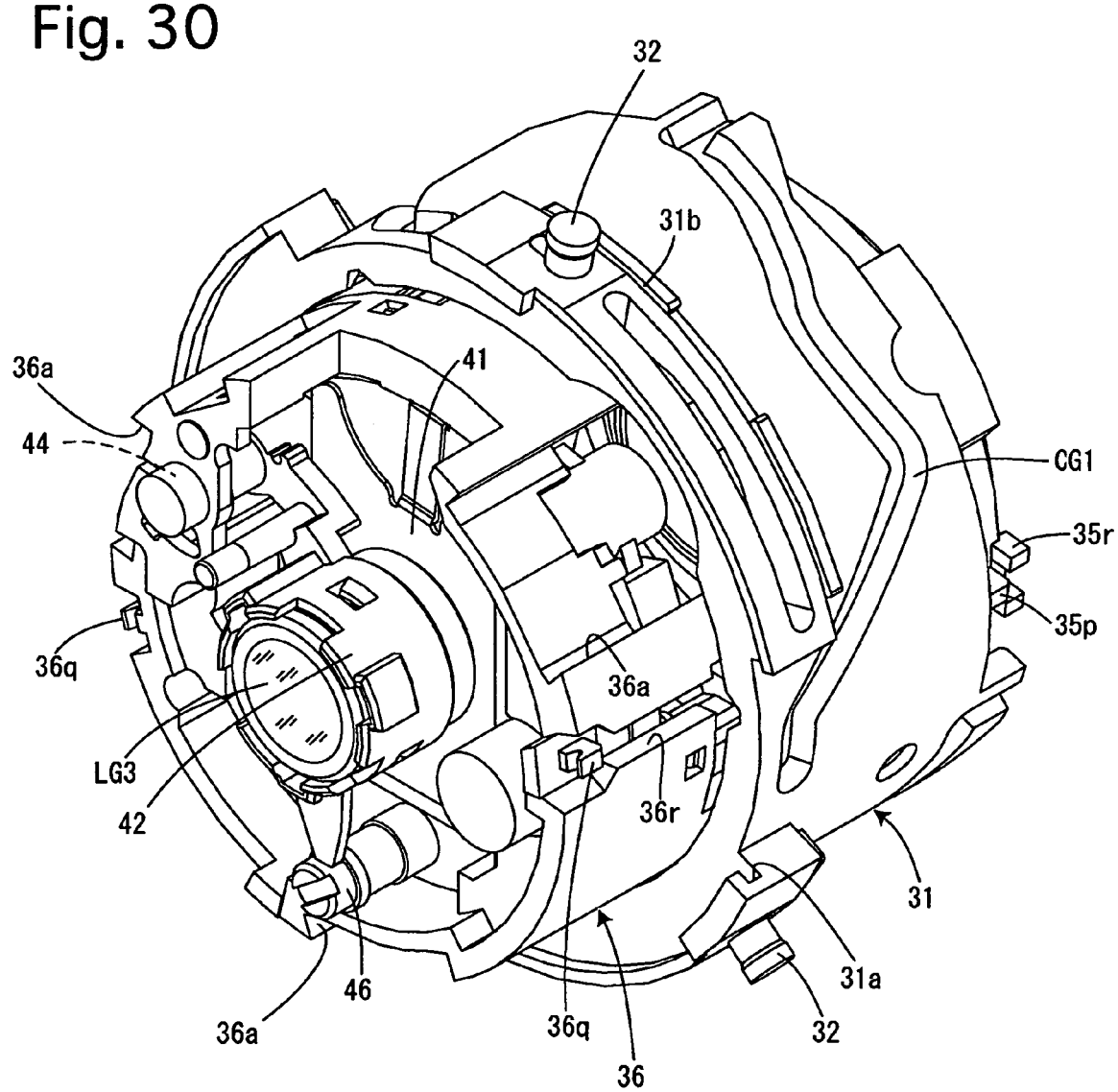
FIG. 30 is a perspective view of the cam ring, the third lens group moving frame and a third lens frame (radially-retractable lens frame) in a ready-to-photograph state of the zoom lens, viewed obliquely from behind.

The third lens frame 42 moves together with the third lens group moving frame 36 in the optical axis direction. As shown in FIGS. 5 and 29, the CCD holder 14 is provided on a front surface thereof with a position-control cam bar (retracting member/stationary cam bar) 49 which projects forward from the CCD holder 14 to be engageable with the third lens frame 42. If the third lens group moving frame 36 moves rearward in a retracting direction to approach the CCD holder 14, a retracting cam surface 49a (see FIG. 29) formed on a front end surface of the position-control cam bar 49 comes into contact with a specific portion of the third lens frame 42 to rotate the third lens frame 42 to the radially-retracted position. The position-control cam bar 49 is further provided along an inner side edge thereof with a radially-retracted-position holding surface 49b which extends rearward from the retracting cam surface 49a in a direction parallel to the photographing optical axis Z1.

Figure 12:
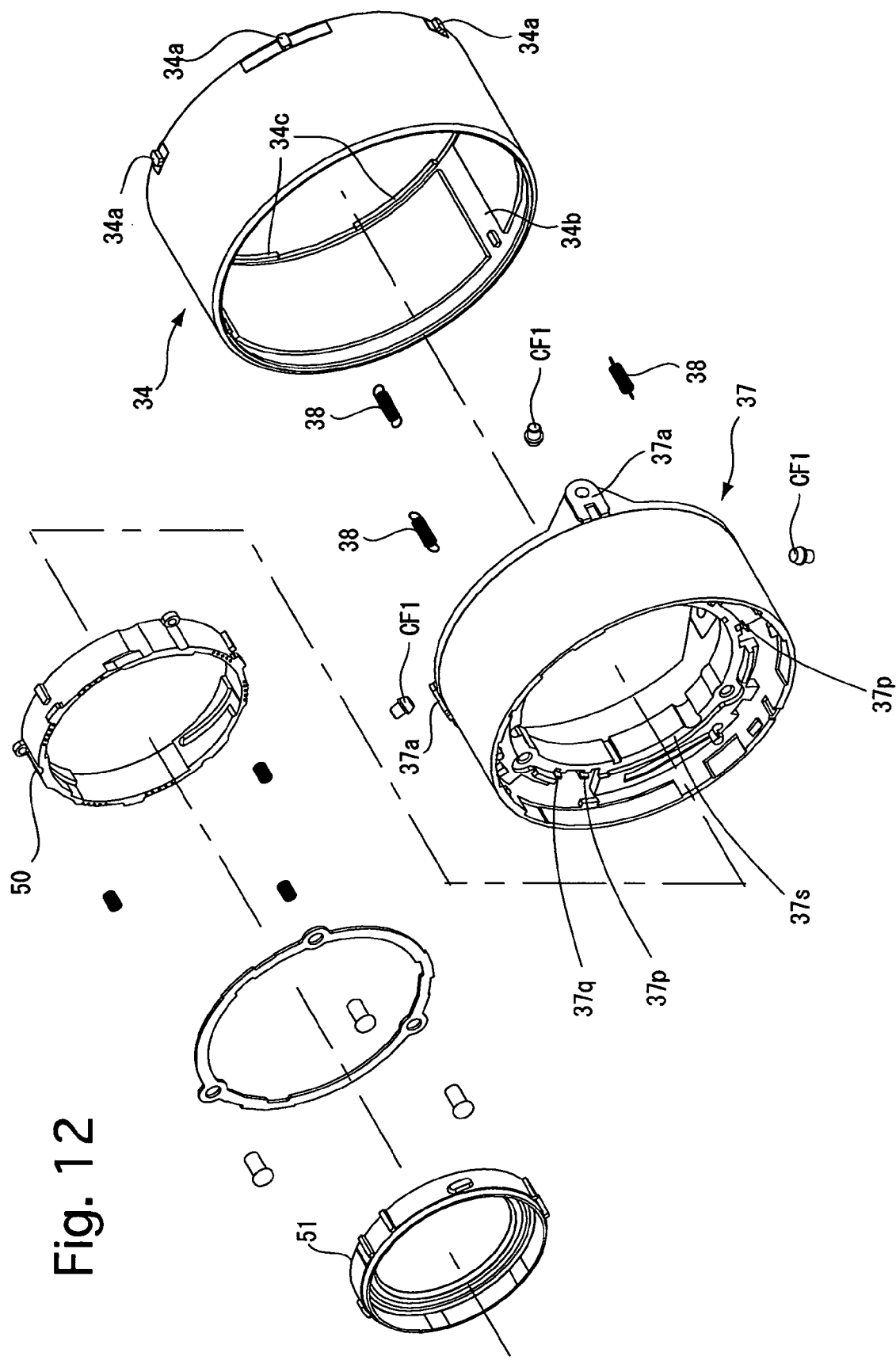
FIG. 12 is an exploded perspective view of a support structure that supports a first lens group.

As shown in FIG. 12, the second external barrel 34 is provided on an inner peripheral surface thereof with a set of three linear guide grooves 34b which are formed at different circumferential positions to extend parallel the photographing optical axis Z1. The first external barrel 37 is provided on an outer peripheral surface at the rear end thereof with a set of three engaging protrusions 37a which are slidably engaged in the set of three linear guide grooves 34b, respectively. Accordingly, the first external barrel 37 is guided linearly in the optical axis direction without rotating via the first linear guide ring 30 and the second external barrel 34. The second external barrel 34 is further provided on an inner peripheral surface thereof in the vicinity of the rear end of the second external barrel 34 with a discontinuous inner flange 34c which extends along a circumference of the second external barrel 34. The cam ring 31 is provided on an outer peripheral surface thereof with a discontinuous circumferential groove 31b in which the discontinuous inner flange 34c is slidably engaged so that the cam ring 31 is rotatable about the photographing optical axis Z1 relative to the second external barrel 34 and so that the second external barrel 34 is immovable in the optical axis direction relative to the cam ring 31 (i.e., the second external barrel 34 moves together with the cam ring 31 in the optical axis direction). On the other hand, the first external barrel 37 is provided on an inner peripheral surface thereof with a set of three cam followers (first cam followers) CF1 which project radially inwards, and the cam ring 31 is provided on an outer peripheral surface thereof with a set of three outer cam grooves (driving device/first cam grooves) CG1 in which the set of three cam followers CF1 are slidably engaged, respectively.

The zoom lens 10 is provided inside of the first external barrel 37 with a first lens frame 51 which is supported by the first external barrel 37 via a first lens group adjustment ring 50. The first lens group LG1 is supported by the first lens frame 51 to be fixed thereto. The first lens frame 51 is provided on an outer peripheral surface thereof with a partial male screw thread 51a, and the first lens group adjustment ring 50 is provided on an inner peripheral surface thereof with a partial female screw thread 50a which is engaged with the male screw thread 51a (see FIG. 12). The position of the first lens frame 51 relative to the first lens group adjustment ring 50 in the optical axis direction can be adjusted during assembly of the zoom lens 10 via the partial male screw thread 51a and the partial female screw thread 50a.

The zoom lens 10 is provided at the front end of the first external barrel 37 with a lens barrier mechanism 54 (see FIG. 4) which automatically closes a front end aperture of the zoom lens 10 when the zoom lens 10 is retracted as shown in FIG. 3 to protect the frontmost lens element of the photographing optical system of the zoom lens 10, i.e. the first lens group LG1, from getting stains and scratches thereon when the digital camera is not in use. The lens barrier mechanism 54 is provided with a plurality of barrier blades (a front pair of barrier blades and a rear pair of barrier blades) 54a. The lens barrier mechanism 54 operates so that the plurality of barrier blades 54a are fully shut in front of the first lens group LG1 in the retracted state of the zoom lens 10 shown in FIG. 3, and are fully opened in a ready-to-photograph state of the zoom lens 10 shown in FIGS. 1 and 2.

A lens barrel advancing operation and a lens barrel retracting operation of the zoom lens 10 having the above described structure will be discussed hereinafter. In the state shown in FIG. 3, in which the zoom lens 10 is in the retracted state, rotating the zoom gear 22 in the lens barrel advancing direction by the zoom motor 23 causes a combination of the helicoid ring 25 and the third external barrel 26 to move forward while rotating due to the engagement of the female helicoid 13a with the male helicoid 25a, and further causes the first linear guide ring 30 to move forward linearly together with the helicoid ring 25 and the third external barrel 26. At this time, firstly the cam ring 31 does not rotate but only linearly moves forward together with the helicoid ring 25, the third external barrel 26 and the first linear guide ring 30, and subsequently torque is transferred to the cam ring 31 from the third external barrel 26 to move forward while rotating relative to the first linear guide ring 30 by the engagement of the set of roller followers 32 with the first lead slot portions 30e-2 of the set of through slots 30e after having been rotated by the aforementioned rotation of the combination of the helicoid ring 25 and the third external barrel 26 by an angle of approximately 30 degrees. Immediately after the helicoid ring 25 and the third external barrel 26 are extended forward to respective predetermined positions thereof, the male helicoid 25a of the helicoid ring 25 and the female helicoid 13a of the stationary barrel 13 are disengaged from each other, so that the helicoid ring 25 and the third external barrel 26 rotate about the photographing optical axis Z1 without moving in the optical axis direction due to the slidable engagement of the set of three rotational guide projections 25b with the set of three rotational guide grooves 13d. After a lapse of a predetermined period of time from the moment at which the helicoid ring 25 and the third external barrel 26 stop moving forward in the optical axis direction (i.e., the moment at which the set of three rotational guide projections 25b slide into the set of three rotational guide grooves 13d from the set of three inclined grooves 13c, respectively), the set of three roller followers 32 enter the second lead slot portion 30e-3 from the first lead slot portions 30e-2 of the set of three through slots 30e, respectively, so that the cam ring 31 is further moved forward while rotating relative to the first linear guide ring 30.

A rotation of the cam ring 31 causes each of the second lens group moving frame 35 and the third lens group moving frame 36, which are positioned inside of the cam ring 31 and guided linearly in the optical axis direction without rotating directly or indirectly by the second linear guide ring 33, to move in the optical axis direction with respect to the cam ring 31 in a predetermined moving manner due to the engagement of the set of front cam followers CF3 with the set of front inner cam grooves CG3 and the engagement of the set of rear cam followers CF2 with the set of rear inner cam grooves CG2, respectively. In the state shown in FIG. 3 in which the zoom lens 10 is in the retracted state, the third lens frame 42, which is provided in the third lens group moving frame 36, has rotated about the pivot shaft 44 to be held in the radially-retracted position above the photographing optical axis Z1 by the position-control cam bar 49, so that the optical axis of the third lens group LG3 is moved from the photographing optical axis Z1 to the retracted optical axis Z2 that is positioned above the photographing optical axis Z1. In the course of movement of the third lens group moving frame 36 from the retracted position to a position in the zooming range as shown in FIGS. 1, 2, 30 and 32, the third lens frame 42 is disengaged from the position-control cam bar 49 to rotate about the pivot shaft 44 from the radially-retracted position to the photographing position shown in FIGS. 1, 2, 30 and 32, where the optical axis of the third lens group LG3 coincides with the photographing optical axis Z1 by the sprig force of the torsion coil spring 47. Thereafter, the third lens frame 42 remains held in the photographing position until the zoom lens 10 is retracted to the position shown in FIG. 3.

Additionally, the rotation of the cam ring 31 causes the first external barrel 37, which is positioned around the cam ring 31 and guided linearly in the optical axis direction without rotating, to move in the optical axis direction relative to the cam ring 31 in a predetermined moving manner due to engagement of the set of three cam followers CF1 with the set of three outer cam grooves CG1, respectively.

Therefore, an axial position of the first lens group LG1 relative to the picture plane (a light-sensitive surface of the CCD image sensor 12) when the first lens group LG1 is moved forward from the retracted position is determined by the sum of the amount of forward movement of the cam ring 31 relative to the stationary barrel 13 and the amount of movement of the first external barrel 37 relative to the cam ring 31, an axial position of the second lens group LG2 relative to the picture plane when the second lens group LG2 is moved forward from the retracted position is determined by the sum of the amount of forward movement of the cam ring 31 relative to the stationary barrel 13 and the amount of movement of the second lens group moving frame 35 relative to the cam ring 31, and an axial position of the third lens group LG3 relative to the picture plane when the third lens group LG3 is moved forward from the retracted position is determined by the sum of the amount of forward movement of the cam ring 31 relative to the stationary barrel 13 and the amount of movement of the third lens group moving frame 36 relative to the cam ring 31. A zooming operation is carried out by moving the first, second and third lens groups LG1, LG2 and LG3 on the photographing optical axis Z1 while changing the distances therebetween. When the zoom lens 10 is driven to advance from the retracted position shown in FIG. 3, the zoom lens 10 firstly moves forward to the position shown in FIG. 1, in which the zoom lens 10 is set at wide-angle extremity. Subsequently, the zoom lens 10 moves forward to the position shown in FIG. 2, in which the zoom lens 10 is set at the telephoto extremity by a further rotation of the zoom motor 23 in a lens barrel advancing direction thereof. As can be seen from these sectional views of the zoom lens 10 shown in FIGS. 1 and 2, the distance between the first and second lens groups LG1 and LG2 is minimum and the distance between the second and third lens groups LG2 and LG3 is great when the zoom lens 10 is set at the wide-angle extremity. When the zoom lens 10 is set at the telephoto extremity, the distance between the first and second lens groups LG1 and LG2 is great and the distance between the second and third lens groups LG2 and LG3 is small. This variation of the distances among the first, second and third lens groups LG1, LG2 and LG3 for zooming operation is achieved by contours of the set of three outer cam grooves CG1, the set of three rear inner cam grooves CG2 and the set of three front inner cam grooves CG3. In the zooming range between the wide-angle extremity and the telephoto extremity, the helicoid ring 25 and the third external barrel 26 rotate without moving in the optical axis direction. On the other hand, in the same zooming range, the cam ring 31 moves forward and rearward in the optical axis direction while rotating due to the engagement of the set of three roller followers 32 with the second lead slot portions 30e-3 of the set of three through slots 30e of the first linear guide ring 30.

When the first through third lens groups LG1, LG2 and LG3 are in the zooming range, a focusing operation is carried out by moving the AF lens frame 17, which holds the fourth lens group LG4, along the photographing optical axis Z1 by rotation of the AF motor 19 in accordance with an object distance.

Driving the zoom motor 23 in a lens barrel retracting direction causes the zoom lens 10 to operate in the reverse manner to the above described advancing operation to retract the zoom lens 10 as shown in FIG. 3. In the course of this retracting movement of the zoom lens 10, the third lens frame 42 rotates about the pivot shaft 44 to the radially-retracted position by the position-control cam bar 49 while moving rearward together with the third lens group moving frame 36. When the zoom lens 10 is retracted to the retracted position shown in FIG. 3, the third lens group LG3 is retracted into the space radially outside of the space in which the fourth lens group LG4, the low-pass filter 11 and the CCD image sensor 12 are retracted as shown in FIG. 3, i.e., the third lens group LG3 is radially retracted into an axial range substantially identical to an axial range in the optical axis direction in which the fourth lens group LG4, the low-pass filter 11 and the CCD image sensor 12 are positioned. This structure of the zoom lens 10 for retracting the third lens group LG3 in this manner reduces the length of the zoom lens 10 when the zoom lens 10 is fully retracted, thus making it possible to reduce the thickness of the camera body in the horizontal direction as viewed in FIG. 3, i.e., in the optical axis direction.

Figure 21:
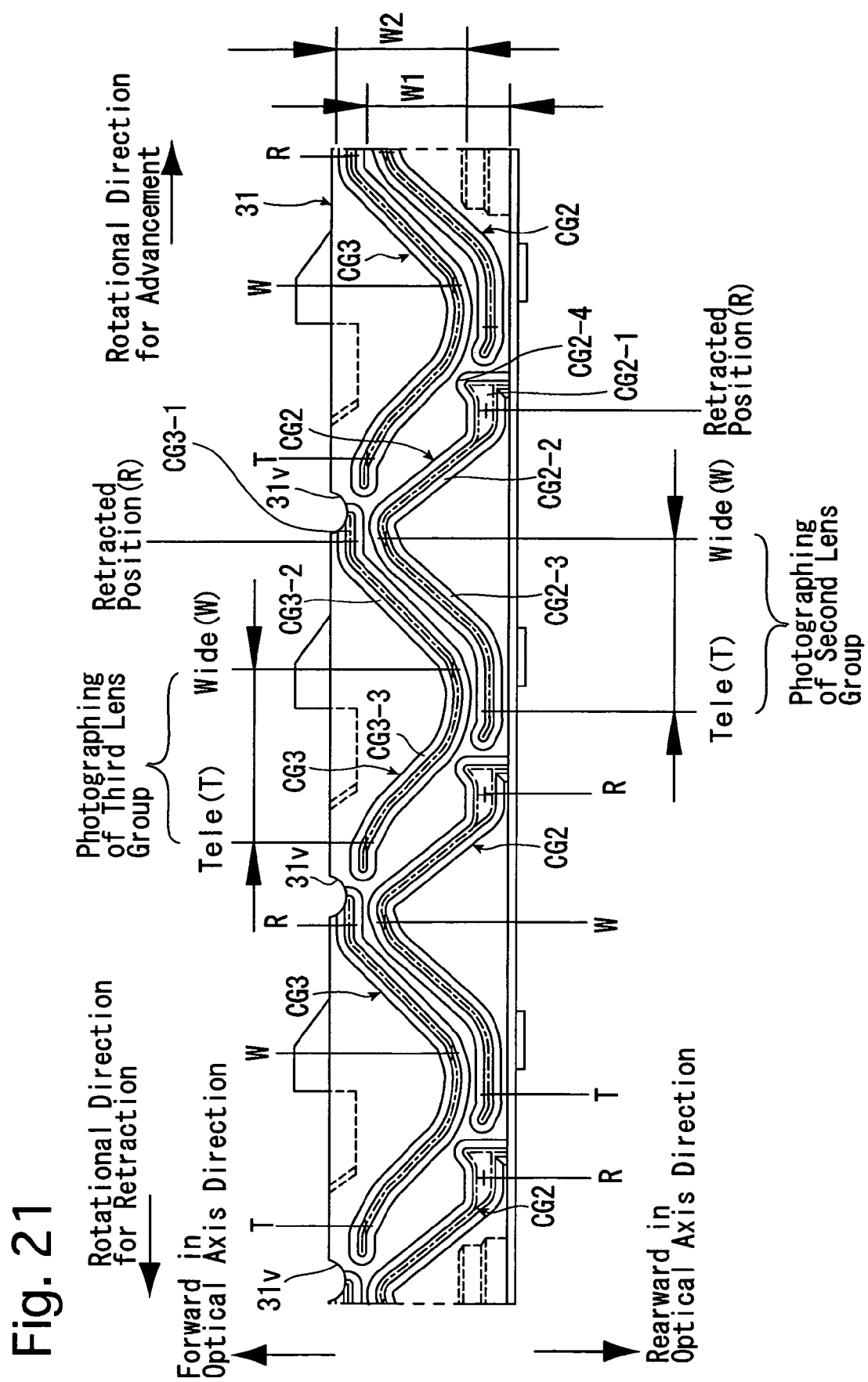
FIG. 21 is a developed view of the cam ring.

The cam mechanism, incorporated in the zoom lens 10, for moving the second lens group LG2 and the third lens group LG3 in the optical axis direction in a predetermined moving manner will be discussed in detail. FIGS. 21 and 25 through 28 show the shapes (contours) of the set of three rear inner cam grooves CG2 and the set of three front inner cam grooves CG3, which are elements of the cam mechanism. Although FIG. 21 is a developed view of the outer peripheral surface of the cam ring 31, the set of three rear inner cam grooves CG2 and the set of three front inner cam grooves CG3 that are formed on the inner peripheral surface of the cam ring 31 are shown by solid lines in FIG. 21 for the purpose of making the shapes of each cam groove easier to be seen. Additionally, although each of FIGS. 25 through 28 is a developed view of the outer peripheral surface of the cam ring 31, the second lens group moving frame 35 and the third lens group moving frame 36 are shown by solid lines in FIGS. 25 through 28 even though positioned radially inside of the cam ring 31. As can be seen in FIGS. 25 through 28, the set of three front inner cam grooves CG3 is positioned in front of the set of three rear inner cam grooves CG2 in the optical axis direction on the inner peripheral surface of the cam ring 31. Accordingly, the positional relationship in the optical axis direction between the second lens group LG2 and the third lens group LG3 is reverse to the positional relationship in the optical axis direction between the set of three rear inner cam grooves CG2, which is configured to move the second lens group LG2, and the set of three front inner cam grooves CG3, which is configured to move the third lens group LG3.

As shown in FIG. 21, each rear inner cam groove CG2 is provided at one end (rear end) thereof with an accommodation section CG2-1 which is wider than the remaining part of the rear inner cam groove CG2, and which is open on a rear end surface of the cam ring 31. Each rear inner cam groove CG2 is further provided with an inclined lead groove section CG2-2 which extends linearly obliquely from the accommodation section CG2-1 toward the front of the cam ring 31, and a return cam groove section CG2-3 which extends from the left end (left end as viewed in FIG. 21) of the inclined lead groove section CG2-2. Additionally, each rear inner cam groove CG2 is provided with a lens-barrel assembling section CG2-4 which projects forward from a front edge of the accommodation section CG2-1 in the optical axis direction. On the other hand, each front inner cam groove CG3 is provided with an accommodation section CG3-1 which extends in a circumferential direction of the cam ring 31, an inclined lead groove section CG3-2 which extends linearly obliquely from the accommodation section CG3-1 toward the rear of the cam ring 31, and a return cam groove section CG3-3 which extends from the left end (left end as viewed in FIG. 21) of the inclined lead groove section CG3-2. The cam ring 31 is provided on the front edge of the cam ring 31 with a set of three cutout portions 31v each having the shape of a semicircle in cross section. The set of three cutout portions 31v are formed to be communicatively connected to one end (right ends as viewed in FIG. 21) of each of the accommodation sections CG3-1 of the set of three front inner cam grooves CG3, respectively, so that these one ends of the accommodation sections CG3-1 are open on the front edge of the cam ring 31. The set of three front cam followers CF3 are inserted into the set of three front inner cam grooves CG3 through the set of three cutout portions 31v, respectively.

Figure 26:
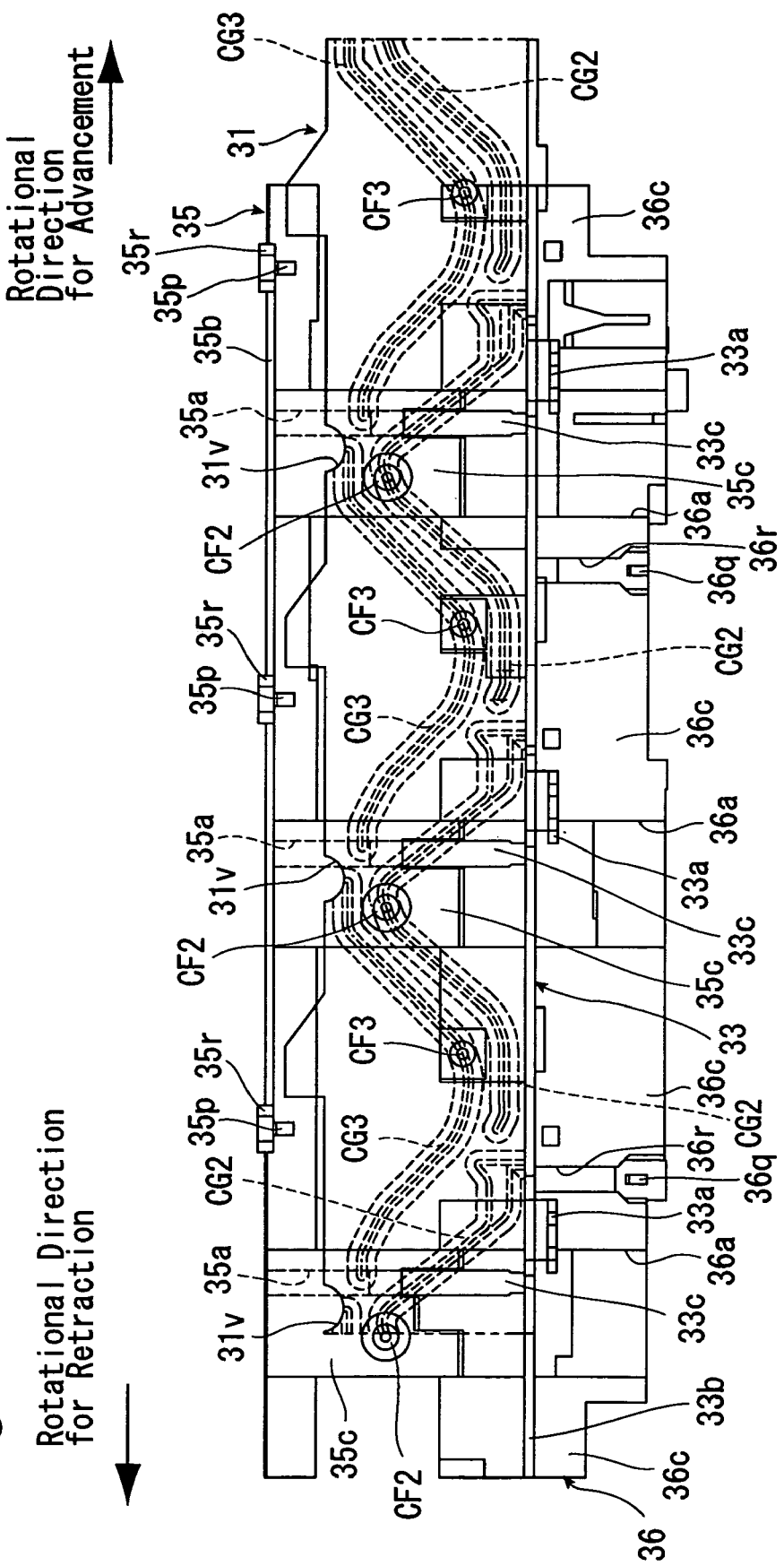
FIG. 26 is a developed view of the second lens group moving frame, the third lens group moving frame, the cam ring and the second linear guide ring, showing the positional relationship thereamong at the wide-angle extremity of the zoom lens.
Figure 27:
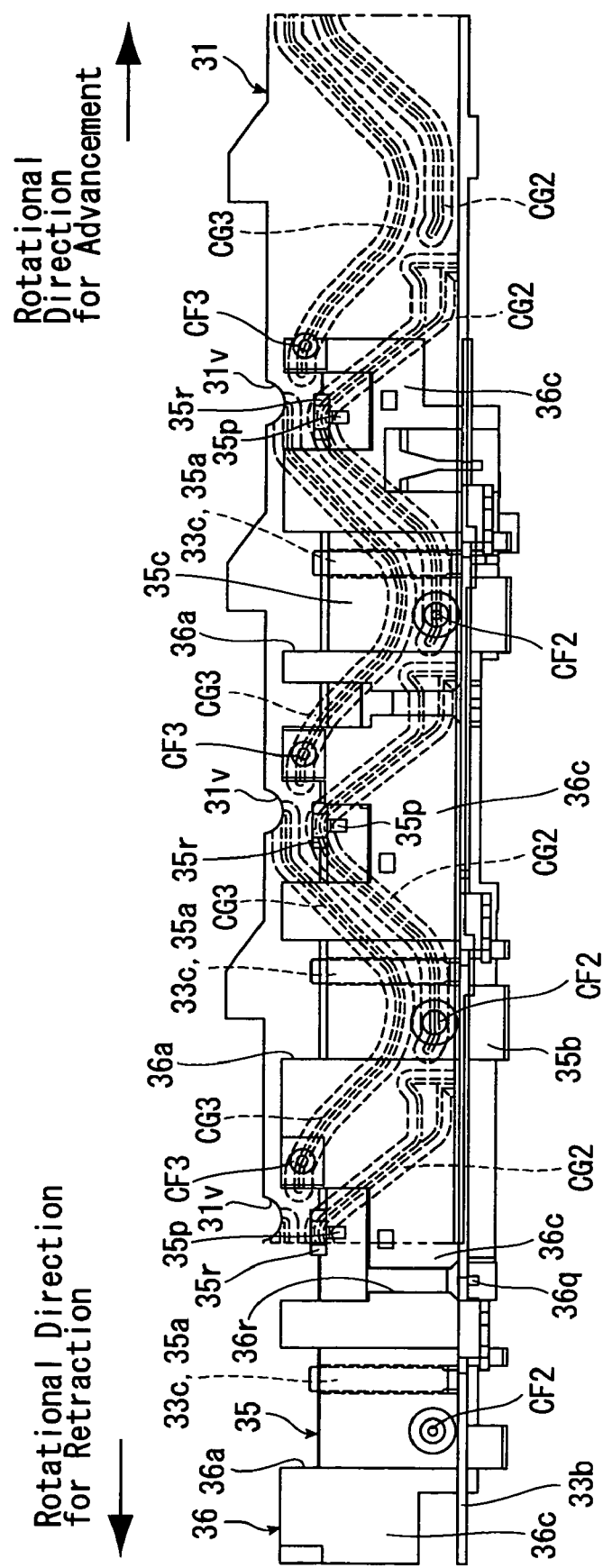
FIG. 27 is a developed view of the second lens group moving frame, the third lens group moving frame, the cam ring and the second linear guide ring, showing the positional relationship thereamong at the telephoto extremity of the zoom lens.

In each rear inner cam groove CG2, a specific portion thereof which is defined by the range between a wide-angle extremity position (W) and a telephoto extremity position (T) in FIG. 21 is used as a photographing range for performing a zooming operation. Likewise, in each front inner cam groove CG3, a specific portion thereof which is defined by the range between a wide-angle extremity position (W) and telephoto extremity position (T) in FIG. 21 is used as a photographing range for performing a zooming operation. When each rear cam follower CF2 and each front cam follower CF3 are positioned in the associated rear inner cam groove CG2 at the wide-angle extremity position (W) thereof and the associated front inner cam groove CG3 at the wide-angle extremity position (W) thereof as shown in FIG. 26, respectively, the zoom lens 10 is at the wide-angle extremity. When each rear cam follower CF2 and each front cam follower CF3 are positioned in the associated rear inner cam groove CG2 at the telephoto extremity position (T) thereof and the associated front inner cam groove CG3 at the telephoto extremity position (T) thereof as shown in FIG. 27, respectively, the zoom lens 10 is at the telephoto extremity. The distance between the second lens group LG2 and the third lens group LG3 is great and the amount of engagement (the amount of overlap) between the set of three rearward projections 35c of the second lens group moving frame 35 and the set of three linear guide grooves 36a of the third lens group moving frame 36 in the optical axis direction is small when the zoom lens 10 is at the wide-angle extremity (see FIGS. 8 and 26). On the other hand, the distance between the second lens group LG2 and the third lens group LG3 is small and the amount of engagement (the amount of overlap) between the set of three rearward projections 35c of the second lens group moving frame 35 and the set of three linear guide grooves 36a of the third lens group moving frame 36 in the optical axis direction is great when the zoom lens 10 is at the telephoto extremity (see FIGS. 9 and 27). In addition, when the zoom lens 10 is in the retracted state as shown in FIG. 3, each rear cam follower CF2 and each front cam follower CF3 are positioned in the accommodation section CG2-1 of the associated rear inner cam groove CG2 and the accommodation section CG3-1 of the associated front inner cam groove CG3, respectively (see FIG. 25).

The inclined lead groove section CG2-2 of each rear inner cam groove CG2 is inclined to the circumferential direction of the cam ring 31 to approach the front of the cam ring 31 in a direction away from the associated accommodation section CG2-1, while the return cam groove section CG2-3 of each rear inner cam groove CG2 is inclined to the circumferential direction of the cam ring 31 to approach the rear of the cam ring 31 in a direction away from the associated inclined lead groove section CG2-2. Conversely, the inclined lead groove section CG3-2 of each front inner cam groove CG3 is inclined to the circumferential direction of the cam ring 31 to approach the rear of the cam ring 31 in a direction away from the associated accommodation section CG3-1, while the return cam groove section CG3-3 of each front inner cam groove CG3 is inclined to the circumferential direction of the cam ring 31 to approach the front of the cam ring 31 in a direction away from the associated inclined lead groove section CG3-2. In other words, with respect to the development view of the cam ring 31 shown in FIG. 21, each rear inner cam groove CG2 is formed in a substantially inverted V shape having the apex thereof at the substantially center of the rear inner cam groove CG2, while each front inner cam groove CG3 is formed in a substantially V shape having the bottom thereof at the substantially center of the front inner cam groove CG3. The set of three rear inner cam grooves CG2 are arranged circumferentially at predetermined intervals while the set of three front inner cam groove CG3 are arranged circumferentially at predetermined intervals in an interengaged manner in the optical axis direction, with the position of the set of three rear inner cam grooves CG2 and the position of the set of three front inner cam grooves CG3 deviating from each other in the circumferential direction of the cam ring 31 (specifically, the position of the set of three rear cam followers CF2 and the position of the set of three front cam followers CF3 deviate from each other in the circumferential direction of the cam ring 31). This pattern of the cam grooves CG2 and CG3 on the cam ring 31 makes it possible to reduce the space between the set of three rear inner cam grooves CG2 and the set of three front inner cam grooves CG3 in the optical axis direction, thus making it possible to reduce the length of the cam ring 31 in the optical axis direction. In the present embodiment of the cam mechanism, the set of three front inner cam grooves CG3 are arranged at equi-angular intervals in the circumferential direction of the cam ring 31 while the set of three rear cam followers CF2 are arranged at equi-angular intervals in the circumferential direction of the cam ring 31 so that the portion of each rear inner cam groove CG2 at the wide-angle extremity position (W) substantially corresponds to the accommodation section CG3-1 of the associated front inner cam groove CG3 in the circumferential direction of the cam ring 31. This positional relationship between the set of three rear inner cam grooves CG2 and the set of three front inner cam grooves CG3 makes it possible for the set of three rear inner cam grooves CG2 and the set of three front inner cam grooves CG3 to be formed closely to each other in the optical axis direction without intersecting each other. Consequently, the length of the cam ring 31 in the optical axis direction is much smaller than the sum of a width W1 (see FIG. 21) of the set of three rear inner cam grooves CG2 and a width W2 (see FIG. 21) of the set of three front inner cam grooves CG3 in the optical axis direction.

Although each rear inner cam groove CG2 and each front inner cam groove CG3 have cam diagrams having the above described inverted V shape and the above described V shape, respectively, neither the inverted V-shaped cam diagram nor the V-shaped cam diagram has a symmetrical shape. Therefore, in the case where the set of three rear inner cam grooves CG2 and the set of three front inner cam grooves CG3 are formed on the cam ring 31 so that the set of three rear inner cam grooves CG2 are positioned in front of the set of three front inner cam grooves CG3 in the optical axis direction in the reverse fashion to the above described embodiment of the cam mechanism, such a front set of three cam grooves and such a rear set of three cam grooves would intersect each other on the same peripheral area of the cam ring 31 (within the same range in the optical axis direction) even if the position of the set of three rear inner cam grooves and the position of the set of three front inner cam grooves are adjusted in the circumferential direction of the cam ring 31. As described above, a single cam ring provided on an inner or outer peripheral surface thereof with two sets of cam grooves for moving two linearly guided optical elements needs to prevent the associated two sets of cam followers that are respectively engaged in the two sets of cam grooves from being disengaged therefrom at points of intersection of the two sets of cam grooves; however, taking such measures is liable to complicate the cam mechanism. For instance, one known solution to such a problem is to provide the cam ring with an auxiliary cam grooves having the same cam diagraphs as the main cam grooves to prevent the two sets of cam followers from being disengaged from the associated two sets of cam grooves. However, to form such auxiliary cam grooves in addition to the main cam grooves, it is necessary to secure an additional area on the cam ring in which the auxiliary cam grooves are formed, and accordingly, the cam ring increases in size. Conversely, in the present invention, the positions between the set of three rear inner cam grooves CG2 and the set of three front inner cam grooves CG3 in the optical axis direction have been changed without regard for the positions of lens groups in the optical axis direction, which are guided linearly in the optical axis direction (the second lens group LG2 and the third lens group LG3 in the above described embodiment of the zoom lens), which makes it possible for the set of three rear inner cam grooves CG2 and the set of three front inner cam grooves CG3 to be formed on the inner peripheral surface of the cam ring 31 while being prevented from intersecting each other with no increase in size of the cam ring 31.

Since each rear cam follower CF2 for moving the second lens group LG2 and each front cam follower CF3 for moving the third lens group LG3 are engaged in the associated rear inner cam groove CG2 and the associated front inner cam groove CG3 that are positioned in the reverse fashion as described above, there have been various design ideas applied to this arrangement and the assembling structure of the set of three rear cam followers CF2 and the set of three front cam followers CF3. Specifically, the set of three rear cam followers CF2 are formed on outer peripheral surfaces of the set of three rearward projections 35c that project rearward from the ring portion 35b of the second lens group moving frame 35, and the set of three front cam followers CF3 are formed on outer peripheral surfaces of three of the six forward projections 36c that project forward from the ring portion 36c of the third lens group moving frame 36. Moreover, the set of three rear cam followers CF2 are formed integral with the set of three rearward projections 35c. Furthermore, the set of three front cam followers CF3 are elements separate from the third lens group moving frame 36, and the third lens group moving frame 36 is provided, on the associated three of the six forward projections 36c in the vicinity of front end thereof, with three follower fixing holes 36v (see FIG. 11) in which the set of three front cam followers CF3 are inserted to be fixed thereto.

As for the second lens group moving frame 35 and the third lens group moving frame 36, the positions between the ring portion 35b, which supports the second lens group LG2, and the ring portion 36b, which supports the third lens group LG3, in the optical axis direction cannot be changed, whereas the positions between the set of three rear cam followers CF2 and the set of three front cam followers CF3 in the optical axis direction, which are respectively provided on the set of three rearward projections 35c and the specific three of the six forward projections 36c that are slidably movable relative to each other in the optical axis direction, can be freely changed without interfering with each other. Therefore, the set of three rear cam followers CF2 and the set of three front cam followers CF3 can be engaged in the set of three rear inner cam grooves CG2 and the set of three front inner cam grooves CG3 (the positions therebetween in the optical axis direction have been changed), respectively, without interference. The positional relationship between the positions between the set of three rear cam followers CF2 and the set of three front cam followers CF3 in the optical axis direction is determined by the cam diagrams of the set of three rear inner cam grooves CG2 and the set of three front inner cam grooves CG3, and the set of three front cam followers CF3 are not always positioned in front of the set of three rear cam followers CF2 in the cam ring 31. For instance, the set of three front cam followers CF3 are positioned in front of the set of three rear cam followers CF2 in the optical axis direction to correspond to the positional relationship between the set of three rear inner cam grooves CG2 and the set of three front inner cam grooves CG3 in the state shown in FIG. 25 in which the zoom lens 10 is in the retracted state and also in the state shown in FIG. 27 in which the zoom lens 10 is at the telephoto extremity, whereas the set of three rear cam followers CF2 are positioned in front of the set of three front cam followers CF3 in the optical axis direction in the state shown in FIG. 26 in which the zoom lens 10 is at the wide-angle extremity.

Figure 28:
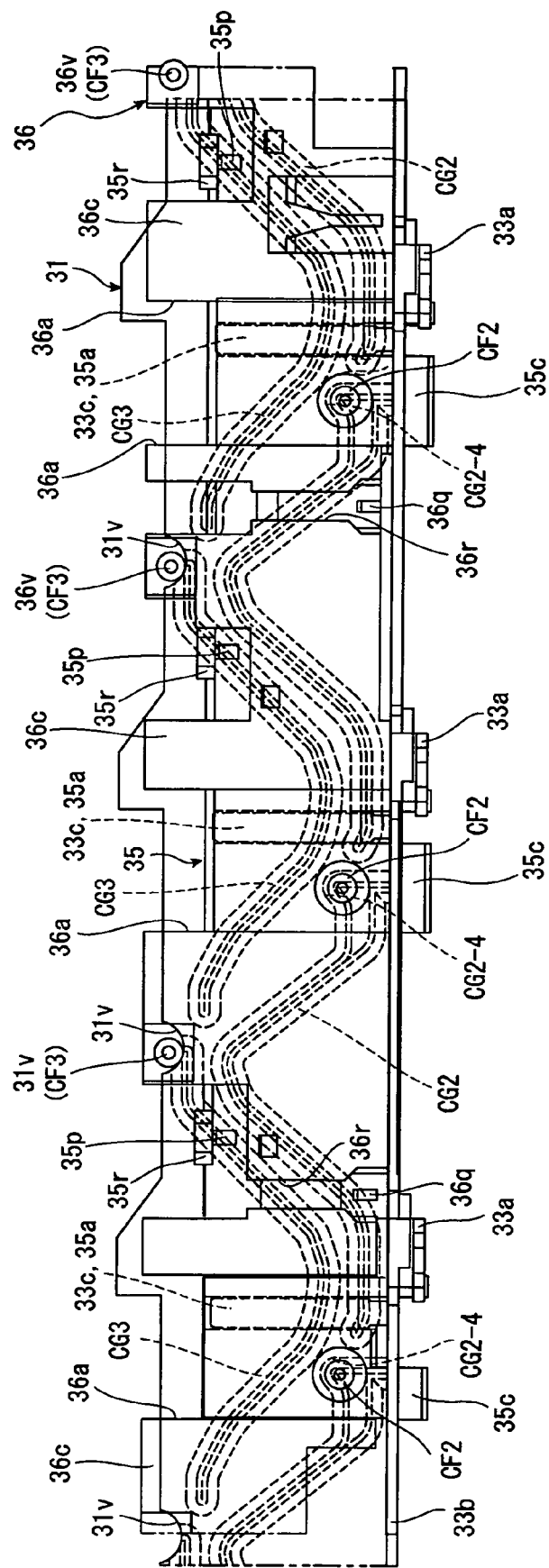
FIG. 28 is a developed view of the second lens group moving frame, the third lens group moving frame, the cam ring and the second linear guide ring, showing a state in which the second lens group moving frame and the third lens group moving frame are in the process of being installed into the cam ring during assembly.

A manner of installing the second lens group moving frame 35 and the third lens group moving frame 36 to the cam ring 31 during assembly of the zoom lens 10 will be discussed hereinafter. Firstly, the second lens frame 40 is fixed to the second lens group moving frame 35, and the shutter block 41 and the third lens frame 42 are fixed to the third lens group moving frame 36. Thereafter, the set of three rearward projections 35c and the set of six forward projections 36c are engaged with each other to unitize the second lens group moving frame 35 and the third lens group moving frame 36 (see FIG. 7). In this unitized state, the second lens group moving frame 35 and the third lens group moving frame 36 are guided linearly in the optical axis direction relative to each other due to the slidable engagement of the set of three rearward projections 35c with the set of six forward projections 36c. Subsequently, this unit of the second lens group moving frame 35 and the third lens group moving frame 36 is inserted into the cam ring 31 from the rear end thereof. At this stage, the set of three front cam followers CF3 are not yet installed to the third lens group moving frame 36. The set of three rear cam followers CF2 are inserted into the set of three rear inner cam grooves CG2, respectively, through the respective openings thereof that are formed on a rear end surface of the cam ring 31. Subsequently, the second lens group moving frame 35 and the third lens group moving frame 36 are pushed forward as an integral unit into the cam ring 31 so that the set of three rear cam followers CF2 enter the lens-barrel assembling sections CG2-4 of the set of three rear inner cam grooves CG2, respectively. Thereupon, the three follower fixing holes 36v, which are formed on three of the six forward projections 36c, are exposed radially outwards from the cam ring 31 through the set of three cutout portions 31v of the cam ring 31, respectively, as shown in FIG. 28. At this stage, the set of three front cam followers CF3 are installed into the three follower fixing holes 36v through the set of three cutout portions 31v, respectively. Subsequently, slightly rotating the cam ring 31 in a lens barrel advancing direction (rightward as viewed in FIG. 28) causes the second lens group moving frame 35 and the third lens group moving frame 36 to integrally move slightly rearward due to the relationship between the set of three rear cam followers CF2 and the second lens group LG2 (an inclined surface which connects the lens-barrel assembling section CG2-4 to the accommodation section CG2-1 in each rear inner cam groove CG2), and simultaneously causes the set of three front cam followers CF3 to move into the openings of the set of three front inner cam grooves CG3 from the set of three cutout portions 31v, respectively. Thereafter, upon the cam ring 31 being rotated to the position (retracted position) shown in FIG. 25, the set of three rear cam followers CF2 have moved away from the openings of the set of three rear inner cam grooves CG2 and reached the accommodation sections CG2-1 while the set of three front cam followers CF3 have moved away from the openings of the set of three front inner cam grooves CG3 and reached the accommodation sections CG3-1, so that the second lens group moving frame 35 and the third lens group moving frame 36 are supported by the cam ring 31 therein.

Figure 34:
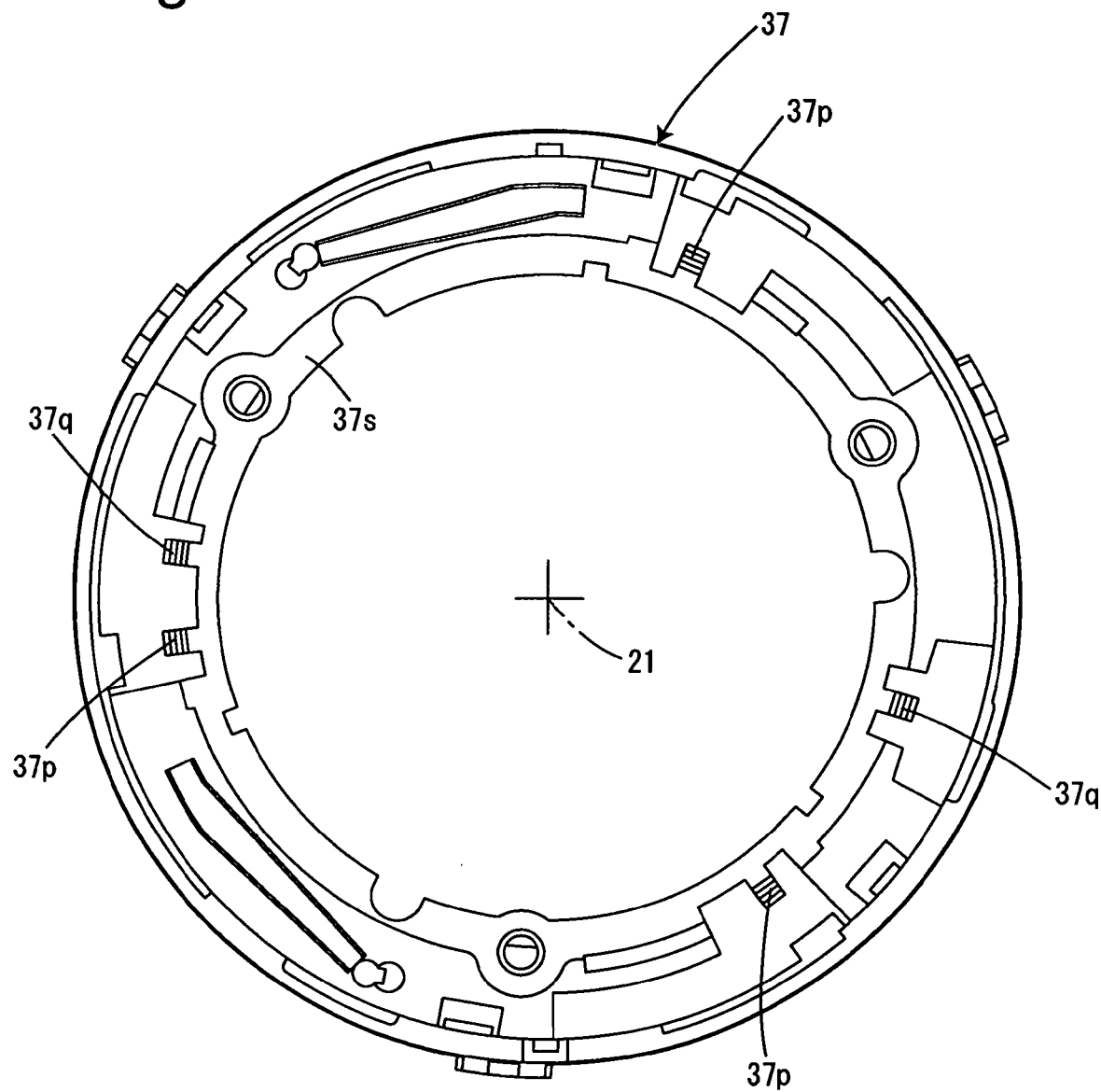
FIG. 34 is a front elevational view of a first external barrel of the zoom lens shown in FIGS. 1 through 3.

The second lens group moving frame 35 and the third lens group moving frame 36, which are supported by the cam ring 31 in the above described manner, are biased forward in the optical axis direction by a set of three extension coil springs (first spring members) 38 (see FIGS. 4, 12 and 35) and a set of two extension coil springs (second spring members) 39 (see FIGS. 4, 11 and 35), respectively. The set of three extension coil springs 38 are arranged at different circumferential positions in a circumferential direction about the optical axis Z1, and one end (front ends) of each of the three extension coil springs 38 are hooked over three hooks 37p (see FIGS. 12 and 34) formed on the first external barrel 37, and the other ends (rear ends) of the three extension coil springs 38 are hooked over three hooks 35p (see FIGS. 7 through 11 and 22) formed on the second lens group moving frame 35. The three hooks 35p are formed on an outer peripheral surface of the ring portion 35b of the second lens group moving frame 35 at substantially equiangular intervals at positions different from the positions of the three rearward projections 35c in a circumferential direction of the second lens group moving frame 35. The second lens group moving frame 35 is provided, on an outer peripheral surface of the ring portion 35b in front of the three hooks 35p in the optical axis direction, with three spring retaining portions 35r for retaining the three extension coil springs 38 to prevent the three extension coil springs 38 from tilting during assembly, respectively. The set of two extension coil springs 39 are arranged at substantially radially opposite sides of the optical axis Z1, and one end (front ends) of each of the two extension coil springs 39 are hooked over two hooks 37q (see FIGS. 12 and 34) formed on the first external barrel 37, and the other end (rear ends) of each of the two extension coil springs 39 are hooked over two hooks 36q (see FIGS. 7 through 11 and 23) formed on the third lens group moving frame 36. The two hooks 36q are formed on the ring portion 36b of the third lens group moving frame 36. The third lens group moving frame 36 is provided, in front of the two hooks 36q in the optical axis direction, with two spring retaining portions 36r for retaining the two extension coil springs 39. The two spring retaining portions 36r are formed by cutting out portions of two of the six forward projections 36c (see FIG. 23). Each of the two spring retaining portions 36r can accommodate a part of the associated extension coil spring 39. As shown in FIG. 34, the first external barrel 37 is provided on an inner peripheral surface thereof with an annular flange 37s. The annular flange 37s is provided thereon between the radially inner edge of the annular flange 37s and the inner peripheral surface of the first external barrel 37 with a plurality of through holes which extend through the annular flange 37s in the optical axis direction. The three hooks 37p and the two spring hooks 37q project radially outwards from the annular flange 37s into these plurality of through holes.

Figure 35:
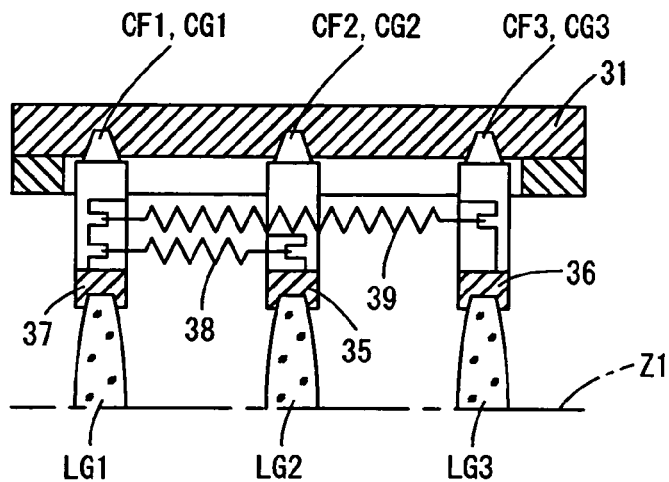
FIG. 35 is a schematic cross sectional view of a spring-biasing structure of the zoom lens shown in FIGS. 1 through 3 which biases lens-group-support movable members by biasing springs.

As can be understood from the above description, in the relationship among the first external barrel 37, the second lens group moving frame 35 and the third lens group moving frame 36, all of which are driven by a common driving member, i.e., the cam ring 31, the first external barrel 37, which supports the first lens group LG1 that is positioned at the front end of the photographing optical system in the optical axis direction, serves as a common-engaging spring support member (spring-load receiving member) which is spring-engaged in common with the second lens group moving frame 35 and the third lens group moving frame 36, which are positioned behind the first external barrel 37 in the optical axis direction, via the set of three extension coil springs 38 and the set of two extension coil springs 39. The set of three extension coil springs 38 and the set of two extension coil springs 39 bias the second lens group moving frame 35 and the third lens group moving frame 36 forward in the optical axis direction relative to the first external barrel 37, respectively, and simultaneously bias the first external barrel 37 rearward in the optical axis direction relative to the second lens group moving frame 35 and the third lens group moving frame 36 to remove backlash in each of the first external barrel 37 (the first lens group LG1), the second lens group moving frame 35 and the third lens group moving frame 36 relative to the cam ring 31 that serves as the aforementioned common-engaging spring support member (i.e., to remove backlash between the cam grooves CG1, CG2 and CG3 and the cam followers CF1, CF2 and CF3, respectively). FIG. 35 schematically shows this spring-biasing relationship. Although the first external barrel 37 is positioned radially outside of the cam ring 31 while the set of three cam followers CF1 and the set of three outer cam grooves CG1 are formed on the outer peripheral surface of the cam ring 31 in the illustrated embodiment of the zoom lens 10, the first external barrel 37 is positioned radially inside of the cam ring 31 in FIG. 35 while all the cam grooves CG1, CG2 and CG3 are formed on the inner peripheral surface of the cam ring 31 in FIG. 35 for the purpose of making the concept of the present invention easier to understand.

In a telescopic of zoom lens such as the present embodiment of the zoom lens 10, it is often the case that the frontmost lens group, which is positioned at the forward end among all the lens groups of a photographing optical system, is the largest in diameter among all the lens groups. The diameter of the first lens group LG1 is larger than the diameters of the second, third and fourth lens groups LG2, LG3 and LG4 in the present embodiment of the zoom lens 10. Therefore, the first external barrel 37 that supports the first lens group LG1 is heavier in weight than other movable barrels or frames such as the second lens group moving frame 35. In addition, since the first external barrel 37 is a movable member which forms a part of the exterior of the zoom lens 10, it is required to enhance the sustainability of the first external barrel 37 so that the first external barrel 37 can return the proper (normal) position thereof when undergoing displacement by external force. On this account, the first external barrel 37 needs to be biased rearward by a strong spring biasing force to improve the stability of the first external barrel 37. In the case of the placement of springs as shown in FIG. 35, the sum of the spring force of the set of three extension coil springs 38 and the spring force of the set of two extension coil springs 39 is exerted on the first external barrel 37 that supports the first lens group LG1, which makes it possible to improve the stability of the first external barrel 37 (the sustainability of the first external barrel 37 due to the spring force). More specifically, in the case of regarding the first external barrel 37 as a reference, both the extension coil springs 38 and 39 apply a biasing force on the first external barrel 37 to bias the first external barrel 37 rearward in the optical axis direction, the sum of the spring force of the set of three extension coil springs 38 and the spring force of the set of two extension coil springs 39 is exerted on the first external barrel 37 efficiently without the spring force of the set of three extension coil springs 38 and the spring force of the set of two extension coil springs 39 being cancelled out.

In the spring-biasing structure of the above illustrated embodiment of the zoom lens, the set of two extension coil springs 39 are installed to be stretched between the first external barrel 37 and the third lens group moving frame 36 which are positioned away from each other in the optical axis direction by a distance greatest among any two of the following three movable members: the first external barrel 37, the second lens group moving frame 35 and the third lens group moving frame 36 that are driven by the common cam ring 31. This arrangement in which a front movable member (the first external barrel 37) and a rear movable member (the third lens group moving frame 36) which are positioned on opposite sides of an intermediate movable member (the second lens group moving frame 35) in the optical axis direction makes it possible to adopt long extension springs such as the two extension coil springs 39. A long extension spring such as each extension coil spring 39 can provide a sufficient spring biasing force more naturally than a short extension spring, and is advantageous to the spring design, i.e., makes it possible to achieve a reduction in spring constant. In addition, at the time of installation of the set of three extension coil springs 38 and the set of two extension coil springs 39, firstly one end (rear ends) of each of the three extension coil springs 38 is hooked over the second lens group moving frame 35 and one end (rear ends) of each of the two extension coil springs 39 is hooked over the third lens group moving frame 36, respectively, and subsequently the other ends (front ends) of all the five extension coil springs 38 and 39 are hooked over the first external barrel 37, to thereby complete the installation of the set of three extension coil springs 38 and the set of two extension coil springs 39. These factors contribute facilitate the assembly of the zoom lens 10 (ease of installation of the set of three extension coil springs 38 and the set of two extension coil springs 39 in the zoom lens 10).

Another feature in the relationship between the spring forces of the set of three extension coil springs 38 and the spring force of the set of two extension coil springs 39 will be discussed thereinafter. As can be understood by comparing FIG. 1 with FIG. 2, the photographing optical system of the zoom lens 10 is designed so that the second lens group LG2 is positioned close to the first lens group LG1 while the third lens group LG3 is positioned away from the first lens group LG1 at the wide-angle extremity of the zoom lens 10 as shown in FIG. 1, whereas the second lens group LG2 is positioned away from the first lens group LG1 while the third lens group LG3 is positioned closer to the first lens group LG1 than that shown in FIG. 1 at the telephoto extremity of the zoom lens 10 as shown in FIG. 2. Namely, regarding the first external barrel 37 (which serves as a common-engaging spring support member to which both one end of each extension coil spring 38 and one end of each extension coil spring 39 are connected) as a reference, the direction of movement of the second lens group LG2 is opposite to the direction of movement of the third lens group LG3 in the zooming range between the wide-angle extremity and the telephoto extremity (see the contours of the cam grooves CG2 and G3 shown in FIG. 21). As a result, when the zoom lens 10 is in a ready-to-photograph state, the spring biasing force of the set of three extension coil springs 38 (the length of each extension coil spring 38) becomes minimum and maximum at the wide-angle extremity and the telephoto extremity of the zoom lens 10, respectively, whereas the spring biasing force of the set of two extension coil springs 39 (the length of each extension coil spring 39) becomes maximum and minimum at the wide-angle extremity and the telephoto extremity of the zoom lens 10, respectively. Accordingly, the relationship of intensity of the spring biasing force between the set of three extension coil springs 38 and the set of two extension coil springs 39 is reversed between the wide-angle extremity and the telephoto extremity of the zoom lens 10, and the spring biasing force of one of the set of three extension coil springs 38 and the set of two extension coil springs 39 decreases as the other of the set of three extension coil springs 38 and the set of two extension coil springs 39 increases. As can be seen from the contours of the set of three rear inner cam grooves CG2 and the set of three front inner cam grooves CG3 in FIG. 21, even in a middle range of the zooming range between the wide-angle extremity and the telephoto extremity, the direction of movement of the second lens group moving frame 35 (the second lens group LG2) and the direction of movement of the third lens group moving frame 36 (the third lens group LG3) in the optical axis direction are substantially opposite to each other so that the spring biasing force of one of the set of three extension coil springs 38 and the set of two extension coil springs 39 decreases as the other of the set of three extension coil springs 38 and the set of two extension coil springs 39 increases. Due to this manner of variation in spring biasing force, wherein the rate of increase (rate of change) in spring biasing force of the set of three extension coil springs 38 and the rate of increase (rate of change) in spring biasing force of the set of two extension coil springs 39 change between a positive increase rate and a negative increase rate and between a negative increase rate and a positive increase rate, respectively, in accordance with the zooming operation of the zoom lens 10, the loads of the springs 38 and 39 on the first external barrel 37 are averaged in the entire photographing range (entire zooming range) of the zoom lens 10.

For instance, if the rate of increase in spring biasing force of the set of three extension coil springs 38 and the rate of increase in spring biasing force of the set of two extension coil springs 39 change in the same positive/negative direction in accordance with the zooming operation of the zoom lens 10 in a different manner from the above described manner of the illustrated embodiment of the zoom lens 10, the difference between the maximum load and the minimum load of the springs 38 and 39 on the first external barrel 37 becomes large. Since the first external barrel 37, which serves as an exterior member of the zoom lens 10 and supports the first lens group LG1 having a large diameter, needs to be biased by a strong spring biasing force as mentioned above, the maximum load of the springs 38 and 39 on the first external barrel 37 will become excessively great if the minimum load of the springs 38 and 39 on the first external barrel 37 is taken as a reference load on the first external barrel 37 in the case where the difference between the maximum load and the minimum load of the springs 38 and 39 on the first external barrel 37 is great. Such an excessive load on the first external barrel 37 becomes a burden on the motor which drives the zoom lens (which corresponds to the zoom motor 23 of the present embodiment of the zoom lens), so that the motor is required to be large. This is disadvantageous to miniaturization of the zoom lens 10. To reduce the difference between the maximum load and the minimum load, the spring biasing forces of two sets of extension springs which respectively correspond to the set of three extension coil springs 38 and the set of two extension coil springs 39 have to be mutually adjusted with precision, which is troublesome and time-consuming. In contrast, in the present embodiment of the zoom lens, the variation in the sum of the load of the set of three extension coil springs 38 on the first external barrel 37 and the load of the set of two extension coil springs 39 on the first external barrel 37 is small during the entire zooming range, and accordingly, no excessive burden is exerted on the zoom motor 23 while the first external barrel 37 can be held easily with stability.

Figure 36:
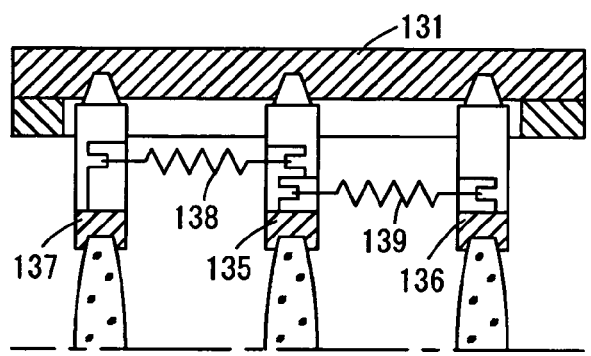
FIG. 36 is a view similar to that of FIG. 35, showing a comparative example of the spring-biasing structure which is to be compared with the spring-biasing structure shown in FIG. 35.
Figure 37:
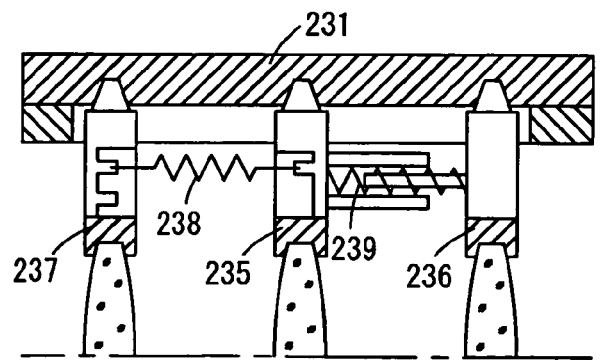
FIG. 37 is a view similar to that of FIG. 35, showing another comparative example of the spring-biasing structure which is to be compared with the spring-biasing structure shown in FIG. 35.

FIGS. 36 and 37 each show a comparative example of spring-biasing structure which is to be compared with the spring-biasing structure of the present embodiment of the zoom lens 10. Although identical to the spring-biasing structure of the present embodiment of the zoom lens 10 in that three lens frames are driven by a common cam ring (131 or 231), the spring-biasing structures shown in FIGS. 36 and 37 that bias the three lens frames with respect to one another are different from the spring-biasing structure of the present embodiment of the zoom lens 10.

In the comparative example of spring-biasing structure shown in FIG. 36, an intermediate lens frame 135 that is positioned between a front lens frame 137 and a rear lens frame 136 in the optical axis direction holds both one end (rear end) of a front extension spring 138 and one end (front end) of a rear extension spring 139, while the front lens frame 137 and the rear lens frame 136 hold the other end (front end) of the front extension spring 138 and the other end (rear end) of the rear extension spring 139, respectively. Although the biasing forces are applied to the single intermediate lens frame 135 from the two extension springs 138 and 139 in the spring-biasing structure shown in FIG. 36, the front extension spring 138 exerts the spring biasing force thereof on the intermediate lens frame 135 in a direction of moving the intermediate lens frame 135 forward while the rear extension spring 139 exerts the spring biasing force thereof on the intermediate lens frame 135 in a direction of moving the intermediate lens frame 135 rearward; consequently, the biasing force of the front extension spring 138 and the biasing force of the rear extension spring 139 cancel each other out. Therefore, a loss of spring biasing force is greater in the spring-biasing structure shown in FIG. 36 than that in the preset embodiment of the zoom lens, in which the biasing directions of the set of three extension coil springs 38 and the set of two extension coil springs 39 relative to the first external barrel 37 are the same to thereby exert the sum of the spring force of the set of three extension coil springs 38 and the spring force of the set of two extension coil springs 39 on the first external barrel 37 efficiently.

In the comparative example of spring-biasing structure shown in FIG. 37, one end (rear end) of a front extension coil spring 238 and one end (front end) of a rear compression coil spring 239 are engaged with an intermediate lens frame 235 that is positioned between a front lens frame 237 and a rear lens frame 236 in the optical axis direction. In this spring-biasing structure, the above described problem in the comparative example of spring-biasing structure shown in FIG. 36 has been resolved because both the front extension coil spring 238 and the rear compression coil spring 239 exert the spring biasing forces thereof on the intermediate lens frame 235 in the same direction of moving the intermediate lens frame 235 forward in the optical axis direction. However, the following problem arises if the front lens frame 237, the intermediate lens frame 235 and the rear lens frame 236 are moved in the same moving manner as the first external barrel 37, the second lens group moving frame 35 and the third lens group moving frame 36 of the above illustrated embodiment of the zoom lens. Firstly, the intermediate lens frame 235 is positioned at a position thereof closest to the front lens frame 237 while the rear lens frame 236 is positioned away from the front lens frame 237 to thereby reduce both the pulling force of the front extension coil spring 238 and the compressive force of the rear compression coil spring 239 when the zoom lens 10 is at the wide-angle extremity. Conversely, when the zoom lens 10 is at the telephoto extremity, the intermediate lens frame 235 is positioned away from the front lens frame 237 and the rear lens frame 236 is positioned close to the front lens frame 237 to thereby increase both the pulling force of the front extension coil spring 238 and the compressive force of the rear extension coil spring 239. Accordingly, the difference between the sum of the spring force of the front extension coil spring 238 and the spring force of the rear compression coil spring 239 at the wide-angle extremity of the zoom lens 10 and the sum of the spring force of the front extension coil spring 238 and the spring force of the rear compression coil spring 239 at the telephoto extremity of the zoom lens 10 becomes excessively large. As described above, this kind of unbalanced spring-biasing state becomes a burden on the motor for driving the lens frames 235, 236 and 237, and is therefore undesirable.

In either of the two spring-biasing structures shown in FIGS. 36 and 37, the intermediate lens frame (135 or 235) serve as a common-engaging spring support member to which both one end of one spring (138 or 238) and one end of another spring (139 or 239) are connected, so that one or more long extension springs such as the set of two extension coil springs 39 of the above described embodiment of the zoom lens which are installed to be stretched between other two optical element support members cannot be adopted. As described above, using a long extension spring such as each extension coil spring 39 instead of a short extension spring simplifies the spring design, improves stability of the spring-biasing structure, and further improves the workability in installing the biasing springs.

As can be understood from the above description, according to the spring-biasing structure incorporated in the present embodiment of the zoom lens, each of three optical element support members (the first external barrel 37, the second lens group moving frame 35 and the third lens group moving frame 36) which are driven by the common cam ring 31 can be biased mutually by biasing springs efficiently by a simple spring-biasing structure to remove backlash in the three optical element support members. Specifically, since the set of three extension coil springs 38 and the set of two extension coil springs 39 are positioned to reverse the rate of increase in biasing force between the set of three extension coil springs 38 and the set of two extension coil springs 39 while biasing the first external barrel 37 in the same direction, a stable biasing force can be applied to the first external barrel 37 without increasing the load of the extension coil springs 38 and 39 on the first external barrel 37.

Although the set of three extension coil springs 38 and the set of two extension coil springs 39 are used in the above illustrated embodiment of the zoom lens, a set of compression coil springs and another set of compression coil springs can be used instead of the set of three extension coil springs 38 and the set of two extension coil springs 39, respectively, to obtain the same effect. If the set of three extension coil springs 38 and the set of two extension coil springs 39 are each replaced by a set of compression coil springs, the spring-biasing direction to each of the three movable barrels or frames (the first external barrel 37, the second lens group moving frame 35 and the third lens group moving frame 36) is reversed. Namely, the first external barrel 37 is biased forward in the optical axis direction with respect to the second lens group moving frame 35 and the third lens group moving frame 36, while each of the second lens group moving frame 35 and the third lens group moving frame 36 is biased rearward in the optical axis direction with respect to the first external barrel 37.

Although the first external barrel 37 serves as a common-engaging spring support member with which two types of extension springs (38 and 39) are commonly engaged in the above illustrated embodiment of the zoom lens, it is possible to modify the spring-biasing structure so that the rear movable barrel or frame (which corresponds to the third lens group moving frame 36 in the above illustrated embodiment of the zoom lens) serves as the common-engaging spring support member. Although the first external barrel 37 desirably serves as the common-engaging spring support member because the first external barrel 37 forms a part of the exterior of the zoom lens 10 and supports the first lens group LG1 having the largest diameter as mentioned above in the above illustrated embodiment of the zoom lens, the present invention does not exclude such a modification wherein the rear movable barrel or frame serves as the common-engaging spring support member if such a spring-biasing structure is desirable in terms of optical design.

Although the spring-biasing relationship among the three movable members: the first external barrel 37, the second lens group moving frame 35 and the third lens group moving frame 36, has been discussed above, the present invention can also be applied to another type of spring-biasing structure wherein more than three movable members are moved in an optical axis direction by a common driving member. For instance, supposing the AF lens frame 17 is a movable member which is moved in the optical axis direction by an associated set of cam grooves formed on the cam ring 31, it is possible that the AF lens frame 17 and the first external barrel 37 be biased toward each other by connecting the ends of a set of biasing springs directly to the AF lens frame 17 and the first external barrel 37, respectively.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A drive mechanism of a zoom lens for driving at least three optical elements of a photographing optical system in an optical axis direction, said drive mechanism comprising:
   a front movable member, an intermediate movable member and a rear movable member, in that order from the front of said zoom lens in said optical axis direction, which support said three optical elements, respectively, and are guided linearly in said optical axis direction without rotating, wherein one of said front movable member and said rear movable member serves as a common-engaging spring support member, and the other of said front movable member and said rear movable member, and said intermediate movable member serve as two single-engaging spring support members;
   a common driving member including a driving device for moving said front, intermediate and rear movable members independently of one another in said optical axis direction to perform a zooming operation; and
   a first spring member and a second spring member for removing backlash between said front, intermediate and rear movable members and said driving device, both one end of said first spring member and one end of said second spring member being connected to said common-engaging spring support member and the other ends of said first spring member and said second spring member being connected to said two single-engaging spring support members, respectively.

2. The drive mechanism according to claim 1, wherein said first spring member and second spring member bias said common-engaging spring support member in the same biasing direction in said optical axis direction.

3. The drive mechanism according to claim 1, wherein said first and second spring members are arranged so that when one of the biasing forces of said first spring member and said second spring member increases, the other of the biasing forces thereof decreases when said front, intermediate and rear movable members are moved independently of one another in said optical axis direction by said common driving member in accordance with a zooming operation of said photographing optical system.

4. The drive mechanism according to claim 1, wherein said common-engaging spring support member comprises an external member of said zoom lens.

5. The drive mechanism according to claim 1, wherein said three optical elements that are supported by said front, intermediate and rear movable members comprise three lens groups, respectively, and wherein said lens group supported by said common-engaging spring support member has the largest diameter among all said three lens groups.

6. The drive mechanism according to claim 1, wherein said optical element supported by said common-engaging spring support member comprises a frontmost lens group in said photographing optical system.

7. The drive mechanism according to claim 1, wherein said common driving member comprises a cam ring rotatable about said optical axis,
   wherein said driving device of said common driving member includes a first cam groove, a second cam groove and a third cam groove which are formed on at least one of inner and outer peripheral surfaces of said cam ring to have different cam diagrams, and wherein said three movable members include a first cam follower, a second cam follower and a third cam follower which are slidably engaged in said first cam groove, said second cam groove and said third cam groove, respectively.

8. The drive mechanism according to claim 1, wherein each of said first spring member and said second spring member comprises at least one extension coil spring.

9. The drive mechanism according to claim 1, wherein said zoom lens is a telescopic zoom lens having a plurality of external movable barrels which are concentrically arranged about said optical axis, said common-engaging spring support member serving as a radially-innermost external movable barrel among said plurality of external movable barrels.

10. The drive mechanism according to claim 1, wherein said rear movable member is guided linearly in said optical axis direction by a linear guide member provided independently of said three movable members.

11. A drive mechanism of a zoom lens, comprising:

a front movable member, an intermediate movable member and a rear movable member, in that order from the front of said zoom lens which are guided linearly in an optical axis direction without rotating;

a cam ring including cam grooves, into which cam followers formed on said front, intermediate and rear movable members are slidably fitted, said cam ring being rotated about said optical axis to move said front, intermediate and rear movable members independently of one another in said optical axis direction to perform a zooming operation; and a first spring member and a second spring member which bias said front, intermediate and rear movable members mutually in said optical axis direction to remove backlash between said cam followers and said cam grooves;

wherein both one end of said first spring member and one end of said second spring member are connected to one of said front movable member and said rear movable member, and wherein the other ends of said first spring member and said second spring member are connected to the other of said front movable member and said rear movable member, and said intermediate movable member, respectively.

12. A drive mechanism of a zoom lens comprising:

a front movable member, an intermediate movable member and a rear movable member, in that order from the front of said zoom lens in said optical axis direction, wherein one of said front movable member and said rear movable member serves as a common-engaging spring support member, and the other of said front movable member and said rear movable member, and said intermediate movable member serve as two single-engaging spring support members;

a common driving member including a driving device for moving said front, intermediate and rear movable members independently of one another in an optical axis direction to perform a zooming operation; and a first spring member and a second spring member for removing backlash between said front, intermediate and rear movable members and said driving device, both one end of said first spring member and one end of said second spring member being connected to said common-engaging spring support member and the other ends of said first spring member and said second spring member being connected to said two single-engaging spring support members, respectively.

* * * * *